United States Patent
Ichikawa

(10) Patent No.: US 8,655,524 B2
(45) Date of Patent: Feb. 18, 2014

(54) POWER SUPPLY SYSTEM, VEHICLE PROVIDED WITH THE SAME AND CONTROL METHOD OF POWER SUPPLY SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 840 days.

(21) Appl. No.: 12/671,444

(22) PCT Filed: Jul. 31, 2008

(86) PCT No.: PCT/JP2008/063749
§ 371 (c)(1),
(2), (4) Date: Jan. 29, 2010

(87) PCT Pub. No.: WO2009/022542
PCT Pub. Date: Feb. 19, 2009

(65) Prior Publication Data
US 2010/0217466 A1  Aug. 26, 2010

(30) Foreign Application Priority Data
Aug. 10, 2007  (JP) ................................ 2007-209890

(51) Int. Cl.
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC ............................................................ 701/22

(58) Field of Classification Search
USPC ............ 701/22; 320/104, 111, 116, 132, 153; 180/65.1, 65.21
See application file for complete search history.

(56) References Cited

U.S. PATENT DOCUMENTS

| 4,663,580 A * | 5/1987 | Wortman ...................... 320/153 |
| 4,803,416 A * | 2/1989 | Abiven et al. ................. 320/132 |

(Continued)

FOREIGN PATENT DOCUMENTS

| JP | A-07-191109 | 7/1995 |
| JP | A-08-116626 | 5/1996 |

(Continued)

OTHER PUBLICATIONS

International Search Report issued in International Application No. PCT/JP2008/063749 on Oct. 7, 2008.

*Primary Examiner* — Khoi Tran
*Assistant Examiner* — Nicholas Kiswanto
(74) *Attorney, Agent, or Firm* — Oliff PLC

(57) ABSTRACT

A power supply system includes power storage units formed of battery assemblies, respectively, converters corresponding to the power storage units, respectively, and a charger receiving an electric power from an external power supply for externally charging the power storage units. An ECU estimates an SOC of each power storage unit based on the SOC of a battery block of the smallest SOC in the power storage unit. When the power storage unit attains a state allowing charging by the external power supply, the ECU controls the corresponding converter to charge the power storage unit with the charge current supplied from the charger, and derives, for each power storage unit, a charge-allowed power based on the SOC of the battery block of the largest SOC. When a total value of the derived charge-allowed powers of the respective power storage units is equal to or smaller than an actual value of the supply power supplied from the external power supply, the ECU ends the external charging of the power storage units.

16 Claims, 10 Drawing Sheets

| ITEMS | CHARGE END CONDITIONS |
|---|---|
| SOC | REACHING TARGET SOC* |
| CHARGE TIME | REACHING ESTIMATED FULL-CHARGE TIME $t_{ch}$* |
| BATTERY TEMPERATURE | BATTERY TEMPERATURE ≥ ALLOWED TEMPERATURE $Tb\_lim$ |
| BATTERY TEMPERATURE CHANGE | RISE TEMPERATURE ≥REFERENCE RISE TEMPERATURE $\Delta Tb\_std$ |
| BATTERY VOLTAGE | REACHING BATTERY VOLTAGE UPPER-LIMIT VALUE $Vb\_up$ |
| Win | Win TOTAL VALUE (= Win1 + Win2) ≤ SUPPLY POWER |

(56) References Cited

U.S. PATENT DOCUMENTS

| | | | |
|---|---|---|---|
| 5,299,226 A * | 3/1994 | Schilling | 375/130 |
| 5,315,228 A * | 5/1994 | Hess et al. | 320/106 |
| 5,446,322 A * | 8/1995 | Reynolds | 327/44 |
| 5,561,362 A * | 10/1996 | Kawamura et al. | 320/134 |
| 5,606,242 A * | 2/1997 | Hull et al. | 320/106 |
| 5,619,116 A * | 4/1997 | Takano et al. | 320/116 |
| 5,710,501 A * | 1/1998 | van Phuoc et al. | 307/150 |
| 5,944,741 A * | 8/1999 | Ochs et al. | 607/5 |
| 5,955,869 A * | 9/1999 | Rathmann | 320/132 |
| 6,124,698 A * | 9/2000 | Sakakibara | 320/110 |
| 6,225,784 B1 * | 5/2001 | Kinoshita et al. | 320/132 |
| 6,226,316 B1 * | 5/2001 | Schilling et al. | 375/142 |
| 6,281,663 B1 * | 8/2001 | Yagi et al. | 320/150 |
| 8,102,146 B2 * | 1/2012 | Suzuki | 320/107 |
| 2002/0113595 A1 | 8/2002 | Sakai et al. | |
| 2003/0107352 A1 | 6/2003 | Downer et al. | |
| 2005/0029988 A1 * | 2/2005 | Tran | 320/132 |
| 2005/0099154 A1 | 5/2005 | Ohnuma et al. | |

FOREIGN PATENT DOCUMENTS

| | | |
|---|---|---|
| JP | A-09-182311 | 7/1997 |
| JP | A-10-341540 | 12/1998 |
| JP | A-11-055866 | 2/1999 |
| JP | A-11-164488 | 6/1999 |
| JP | A-2000-012102 | 1/2000 |
| JP | A-2001-037097 | 2/2001 |
| JP | A-2002-165380 | 6/2002 |
| JP | A-2002-238106 | 8/2002 |
| JP | A-2003-209969 | 7/2003 |
| JP | A-2003-257501 | 9/2003 |

* cited by examiner

FIG.4

| ITEMS | CHARGE END CONDITIONS |
|---|---|
| SOC | REACHING TARGET SOC* |
| CHARGE TIME | REACHING ESTIMATED FULL-CHARGE TIME tch* |
| BATTERY TEMPERATURE | BATTERY TEMPERATURE ≥ ALLOWED TEMPERATURE Tb_lim |
| BATTERY TEMPERATURE CHANGE | RISE TEMPERATURE ≥REFERENCE RISE TEMPERATURE ΔTb_std |
| BATTERY VOLTAGE | REACHING BATTERY VOLTAGE UPPER-LIMIT VALUE Vb_up |
| Win | Win TOTAL VALUE (= Win1 + Win2) ≤ SUPPLY POWER |

FIG.5

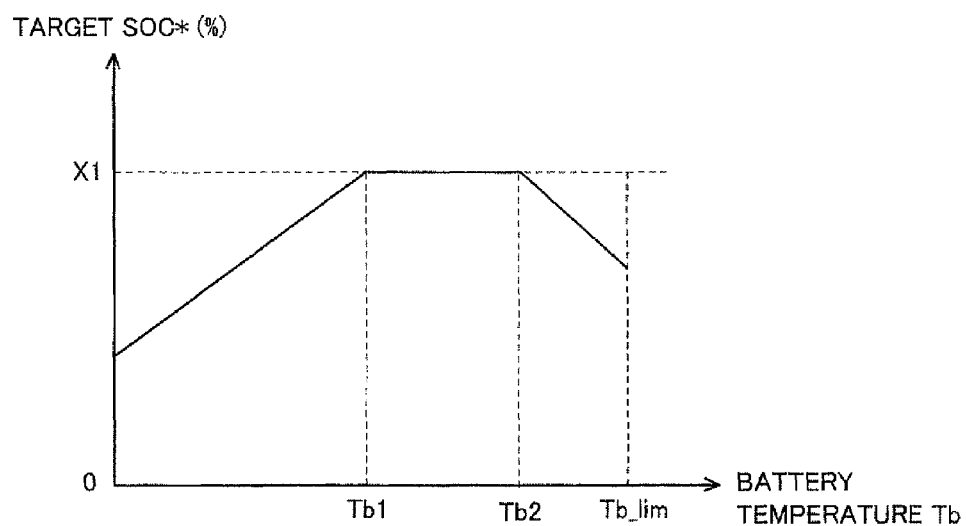

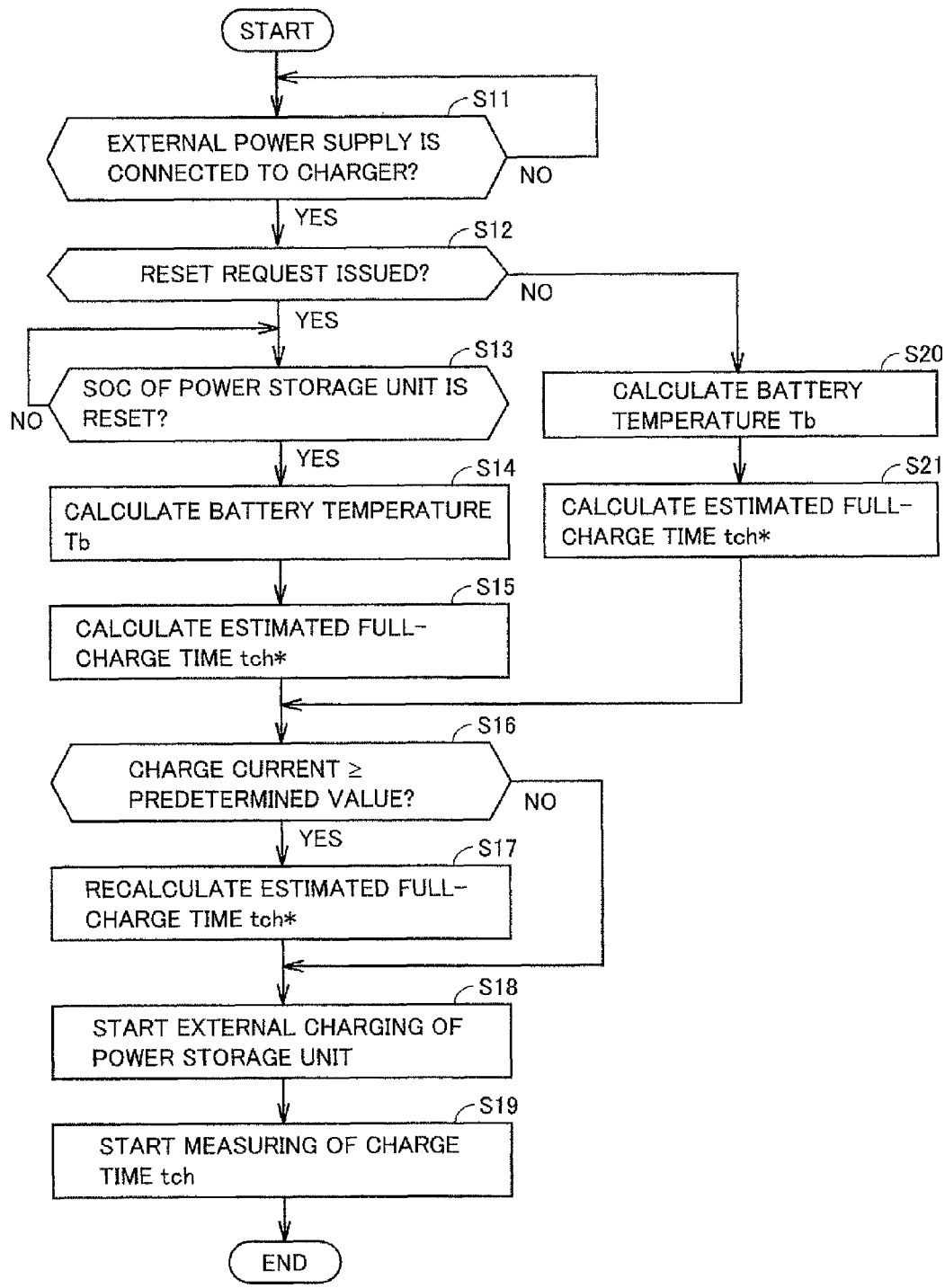

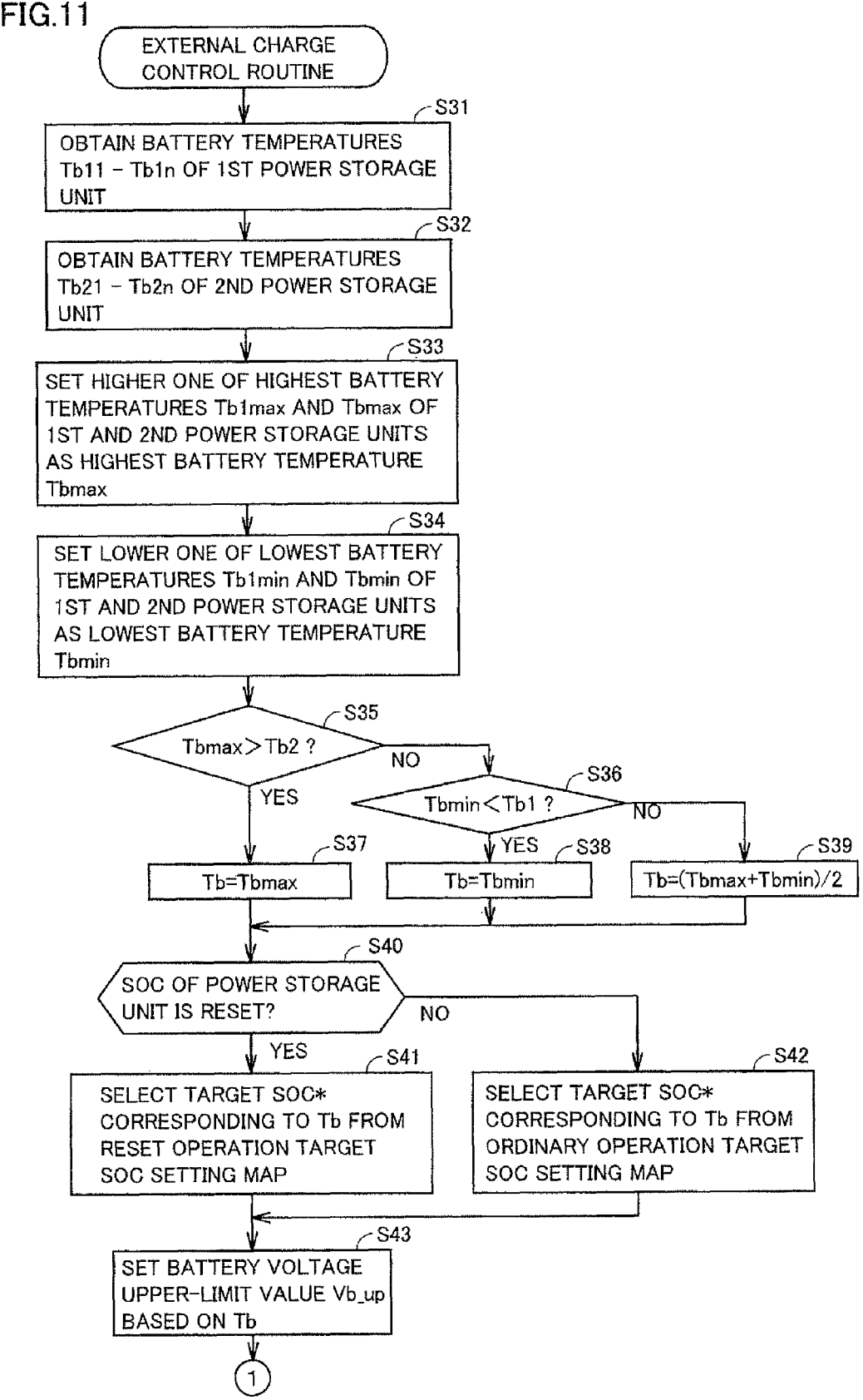

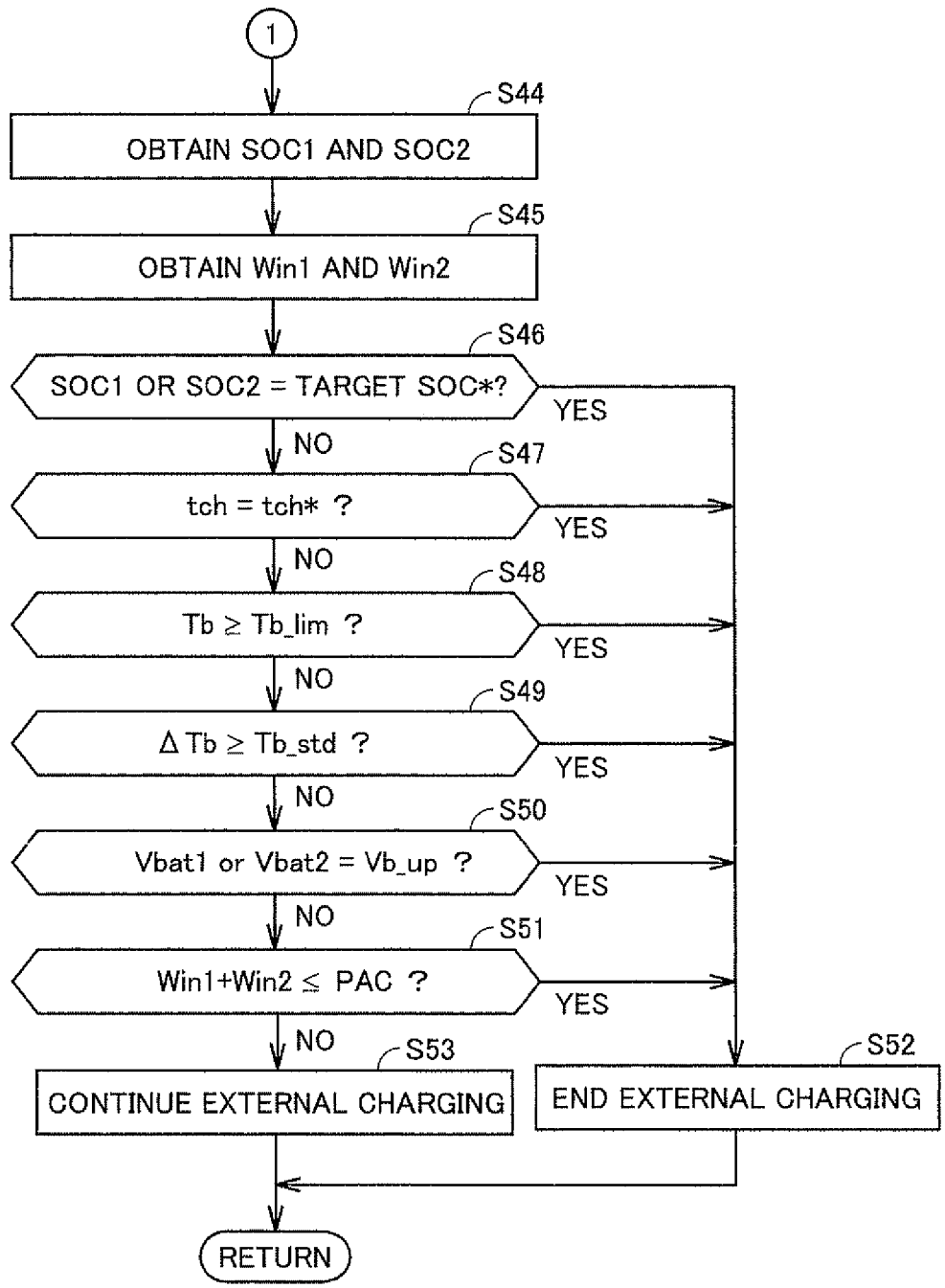

POWER SUPPLY SYSTEM, VEHICLE PROVIDED WITH THE SAME AND CONTROL METHOD OF POWER SUPPLY SYSTEM

TECHNICAL FIELD

The present invention relates to a power supply system, a vehicle provided with the same and a control method of a power supply system, and particularly to a power supply system provided with a plurality of power storage mechanisms, a vehicle provided with the same and a control method of the power storage system.

BACKGROUND ART

In recent years, attention has been given to hybrid vehicles and electric vehicles that run using an drive power provided by an electric motor, against the background of environmental issues. These vehicles are equipped with a power storage mechanism formed of a secondary battery, an electric double-layer capacitor or the like for supplying a power to a drive source, i.e., the electric motor, for converting an kinetic energy into an electric energy during regenerative braking and for storage. Discharging from the power storage mechanism and the charging of the power storage mechanism are performed in view of an SOC (State of Charge) of the power storage mechanism. By keeping the SOC within an appropriate range, the overcharging and overdischarging of the power storage mechanism can be avoided.

In the vehicle that uses the above electric motor as a drive power source, it is desired to increase the charge/discharge capacity of the power storage mechanism for increasing running performance such as acceleration performance and a continuous travel distance without. A structure equipped with a plurality of power storage mechanisms has been proposed as a configuration for increasing the charge/discharge performance of the power storage mechanism.

For example, Japanese Patent Laying-Open No. 2003-209969 (Patent Document 1) has disclosed a power supply control system that has at least one inverter for supplying a regulated power to an electric tractive motor of a vehicle as well as a plurality of power supply stages each having a battery and a boost/back DC-DC converter. These power storage stages are electrically connected in parallel for supplying a DC power to the at least one inverter, and are controlled to keep an output voltage to the at least one inverter.

Patent Document 1: Japanese Patent Laying-Open No. 2003-209969
Patent Document 2: Japanese Patent Laying-Open No. 7-191109
Patent Document 3: Japanese Patent Laying-Open No. 11-055866
Patent Document 4: Japanese Patent Laying-Open No. 11-164488
Patent Document 5: Japanese Patent Laying-Open No. 10-341540
Patent Document 6: Japanese Patent Laying-Open No. 9-182311
Patent Document 7: Japanese Patent Laying-Open No. 2001-037097

DISCLOSURE OF THE INVENTION

Problems to be Solved by the Invention

However, in the power supply control system disclosed in Japanese Patent Laying-Open No. 2003-209969, when the plurality of power supply stages are used for a long time, variations in battery characteristics such as a current, voltage and SOC occur between the power supply stages. This results in a problem that overcharging and overdischarging occur in one or some of the power storage stages of which SOCs fall outside an appropriate range, and therefore the battery performance deteriorates.

For the hybrid vehicle, there is already disclosed a structure that charges am onboard power storage mechanism with a power supplied from an external power supply such as a commercial power. By precharging the power storage mechanism by the external power supply, a vehicle can run without operating an internal combustion engine when the vehicle runs a relatively short distance for commutation, shopping or the like. Therefore, a general fuel consumption rate can be improved. This running mode may be referred to as an EV (Electric Vehicle) running mode.

The hybrid vehicle equipped with the plurality of power storage mechanisms described above is effective at increasing the running performance in the EV running mode because the power storage mechanisms have high charge/discharge performance. However, for sufficiently exerting the charge/discharge performance of each power storage mechanism, it is necessary to avoid the use that causes overcharging and overdischarging in each power storage mechanism. However, Japanese Patent Laying-Open No. 2003-209969 described above has not disclosed a configuration for overcoming the above problem.

Accordingly, the invention has been made for overcoming the above problem, and an object of the invention is to provide a power supply system that can suppress overcharging of a plurality of power storage mechanisms as well as a vehicle provided with the same.

Another object of the invention is to provide a control method of a power supply system that can suppress overcharging of a plurality of power storage mechanisms.

Means for Solving the Problems

A power supply system according to an aspect of the invention includes a plurality of power storage mechanisms allowing charging and discharging; a charger for receiving a power from an external power supply and externally charging the plurality of power storage mechanisms; a state-estimating unit for estimating a remaining capacity of each of the plurality of power storage mechanisms: and a control unit for controlling the charging of the plurality of power storage mechanisms. The control unit includes a charging unit for charging the plurality of power storage mechanisms with a charge current supplied from the charger when the plurality of power storage mechanisms attain a state allowing the charging by the external power supply, a charge-allowed power deriving unit for deriving a charge-allowed power of each of the plurality of power storage mechanisms based on the estimated remaining capacity while the plurality of power storage mechanisms are being externally charged, a first determining unit for determining a relationship in magnitude between a charge-allowed power total value being a total value of the derived charge-allowed powers of the respective power storage mechanisms and a predetermined preset value, and a charge ending unit for ending the external charging of the plurality of power storage mechanisms when the first determining unit determines that the charge-allowed power total value is equal to or smaller than the predetermined value.

According to another aspect, the invention provides a control method of a power supply system including a plurality of power storage mechanisms allowing charging and discharging, a charger for receiving a power from an external power supply and externally charging the plurality of power storage mechanisms, and a state-estimating unit for estimating a remaining capacity of each of the plurality of power storage mechanisms. The control method includes the steps of charging the plurality of power storage mechanisms with a charge current supplied from the charger when the plurality of power storage mechanisms attain a state allowing the charging by the external power supply; deriving a charge-allowed power of each of the plurality of power storage mechanisms based on the estimated remaining capacity while the plurality of power storage mechanisms are being externally charged; determining a relationship in magnitude between a charge-allowed power total value being a total value of the derived charge-allowed powers of the respective power storage mechanisms and a predetermined preset value; and ending the external charging of the plurality of power storage mechanisms when the determining step determines that the charge-allowed power total value is equal to or smaller than the predetermined value.

According to the power supply system and the control method described above, when the charge-allowed power total value of the plurality of power storage mechanisms is equal to or smaller than the predetermined value, the external charging ends so that the overcharging of each power storage mechanism can be reliably suppressed. Thereby, the deterioration of the battery characteristics of the power storage mechanism can be avoided.

Preferably, the first determining unit sets the preset value to an actual value of the power supplied from the external power supply.

Preferably, the determining step sets the preset value to an actual value of the power supplied from the external power supply.

According to the power supply system and the control method described above, when the charge-allowed power total value of the plurality of power storage mechanisms is equal to or smaller than the actual value of the supplied power, the external charging ends so that the overcharging of each power storage mechanism can be reliably suppressed.

Preferably, each of the plurality of power storage mechanisms is formed of a plurality of chargeable and dischargeable power storage units connected in series. The state-estimating unit estimates the remaining capacity of each of the plurality of power storage units. The charge-allowed power deriving unit derives the charge-allowed power of the corresponding power storage mechanism based on the remaining capacity of the power storage unit exhibiting the maximum estimated remaining capacity.

Preferably, the step of deriving the charge-allowed power derives the charge-allowed power of the corresponding power storage mechanism based on the remaining capacity of the power storage unit exhibiting the maximum estimated remaining capacity.

According to the power supply system and the control method described above, the charge-allowed power of the power storage mechanism is derived based on the remaining capacity of the power storage unit that is most likely to undergo the overcharging. Therefore, the overcharging of each power storage unit can be reliably avoided.

Preferably, the state-estimating unit resets the remaining capacity of each of the plurality of power storage mechanisms to a reference value based on the voltage value of the corresponding power storage mechanism when the plurality of power storage mechanisms attain the state allowing the charging by the external power supply.

According to the power supply system and the control method described above, the remaining capacity of each of the plurality of power storage mechanisms is reset so that the remaining capacity can be estimated precisely. Thereby, the overcharging of each power storage mechanism can be reliably suppressed.

Preferably, the power supply system further includes a power storage mechanism temperature obtaining unit for obtaining a temperature of each of the plurality of power storage mechanisms, and obtaining a rise temperature of each of the plurality of power storage mechanisms based on the temperature of the corresponding one of the plurality of power storage mechanisms; and a power storage mechanism voltage value obtaining unit for obtaining the voltage value of each of the plurality of power storage mechanisms. The control unit further includes a second determining unit for setting the remaining capacity target value of the plurality of power storage mechanisms based on the obtained temperature of each of the plurality of power storage mechanisms, and determining whether the estimated remaining capacity of each of the plurality of power storage mechanisms has reached the remaining capacitance target value or not, a third determining unit for determining whether the obtained temperature of each of the plurality of power storage mechanisms has reached a predetermined allowed upper-limit temperature or not, a fourth determining unit for determining whether the obtained rise temperature of each of the plurality of power storage mechanisms is equal to or larger than a predetermined reference value or not, a fifth determining unit for determining whether the obtained voltage value of each of the plurality of power storage mechanisms has reached a predetermined upper-limit voltage value or not, and a sixth determining unit for calculating an estimated full-charge time required for completing the external charging of the plurality of power storage mechanisms, based on a difference between the estimated remaining capacity of each of the plurality of power storage mechanisms and the fully charged state, and determining whether an execution time of the external charging has reached the estimated full-charge time or not. The charge ending unit ends the external charging of the plurality of power storage mechanisms, in response to satisfaction of one of such conditions that the first determining unit determines that the total value of the charge-allowed powers is equal to or smaller than the predetermined value, that the second determining unit determines that the remaining capacity of one of the plurality of power storage mechanisms has reached the remaining capacity target value, that the third determining unit determines that the temperature of one of the plurality of power storage mechanisms has reached the predetermined allowed upper-limit temperature, that the fourth determining unit determines that the rise temperature of one of the plurality of power storage mechanisms is equal to or larger than the predetermined reference value, that the fifth determining unit determines that the voltage value of one of the plurality of power storage mechanisms has reached the predetermined upper-limit voltage value, and that the sixth determining unit determines that the execution time of the external charging of one of the plurality of power storage mechanisms has reached the estimated full-charge time.

Preferably the control method further includes the steps of setting the remaining capacity target value of the plurality of power storage mechanisms based on the obtained temperature of each of the plurality of power storage mechanisms, and determining whether the estimated remaining capacity of each of the plurality of power storage mechanisms has reached the remaining capacitance target value or not; determining whether the obtained temperature of each of the plurality of power storage mechanisms has reached a predetermined allowed upper-limit temperature or not; determining whether the obtained rise temperature of each of the plurality of power storage mechanisms is equal to or larger than a predetermined reference value or not; determining whether the obtained voltage value of each of the plurality of power storage mechanisms has reached a predetermined upper-limit voltage value or not; and calculating an estimated full-charge time required for completing the external charging of the plurality of power storage mechanisms, based on a difference between the estimated remaining capacity of each of the plurality of power storage mechanisms and the fully charged state, and determining whether an execution time of the external charging has reached the estimated full-charge time or not. The step of ending the external charging ends the external charging of the plurality of power storage mechanisms, in response to satisfaction of one of such conditions that it is determined that the total value of the charge-allowed powers is equal to or smaller than the predetermined value, that it is determined that the remaining capacity of one of the plurality of power storage mechanisms has reached the remaining capacity target value, that it is determined that the temperature of one of the plurality of power storage mechanisms has reached the predetermined allowed upper-limit temperature, that it is determined that the rise temperature of one of the plurality of power storage mechanisms is equal to or larger than the predetermined reference value, that it is determined that the voltage value of one of the plurality of power storage mechanisms has reached the predetermined upper-limit voltage value, and that it is determined that the execution time of the external charging of one of the plurality of power storage mechanisms has reached the estimated full-charge time.

According to the power supply system and the control method described above, even when variations in battery characteristics occur between the power storage mechanisms, the external charging ends in response to the satisfaction of one of the plurality of charge end conditions that are set based on the battery characteristics of each power storage mechanism. Therefore, the overcharging of each power storage mechanism can be reliably suppressed.

Preferably, the state estimating unit resets the remaining capacity of each of the plurality of power storage mechanisms based on the voltage value of corresponding one of the plurality of power storage mechanisms when the plurality of power storage mechanisms attain the state allowing the charging by the external power supply. The sixth determining unit estimates the estimated full-charge time based on a difference between the estimated remaining capacitance of each of the plurality of power storage mechanisms and the full-charge state, after the state estimating unit resets the remaining capacitance of each of the plurality of power storage mechanisms to the reference value.

Preferably, the step of determining whether the execution time of the external charging has reached the estimated full-charge time or not estimates the estimated full-charge time based on a difference between the estimated remaining capacitance of each of the plurality of power storage mechanisms and the full-charge state, after the state estimating unit resets the remaining capacitance of each of the plurality of power storage mechanisms to the reference value.

According to the power supply system and the control method described above, the remaining capacitance of each power storage mechanism can be precisely estimated by resetting the remaining capacitance of the power storage mechanism. Thereby, the overcharging of each power storage mechanism can be reliably suppressed during the external charging.

Preferably, each of the plurality of power storage mechanisms is formed of a plurality of chargeable and dischargeable power storage units connected in series. When the power storage mechanism temperature obtaining unit obtains the temperature of each of the power storage units in each of the plurality of power storage mechanisms, the power storage mechanism temperature obtaining unit outputs the temperature of the power storage unit deviating from a predetermined temperature range to the largest extent as a representative value of the temperature of the corresponding power storage mechanism.

According to the power supply system and the control method described above, the temperature of the power storage unit that is most likely to undergo the overcharging is employed as the representative value of the temperature of the power storage mechanism so that the overcharging of each power storage mechanism can be avoided.

Preferably, the power supply system further includes a plurality of voltage converting units corresponding to the plurality of power storage mechanisms, respectively; and a power line pair connected to the plurality of voltage converting units arranged in parallel with each other. When the plurality of power storage mechanisms attain the state allowing the charging by the external power supply, the charging unit controls the corresponding voltage converting unit to charge the plurality of power storage mechanisms with the charge current supplied from the charger.

Preferably, when the plurality of power storage mechanisms attain the state allowing the charging by the external power supply, the step of charging controls the corresponding voltage converting unit to charge the plurality of power storage mechanisms with the charge current supplied from the charger.

According to another aspect, the invention provides a vehicle including one of the power supply systems described above; and a drive power generating unit receiving an electric power supplied from the power supply system through the power line pair and generating a drive power.

According to the vehicle described above, the plurality of power storage mechanisms can be externally charged while avoiding the overcharging of each power storage mechanism. Therefore, each power storage mechanism can sufficiently exhibit the charge/discharge performance so that the total fuel consumption efficiency can be improved.

EFFECTS OF THE INVENTION

The invention can protect each of the plurality of power storage mechanisms from the overcharging.

BRIEF DESCRIPTION OF THE DRAWINGS

FIG. 4 shows an example of a reset value in a battery block.

FIG. 5 shows a relationship between a battery temperature and an SOC target value.

FIG. 10 is a flowchart showing a processing procedure for starting an external charging operation in a converter control unit.

FIG. 11 is a flowchart showing a processing procedure of an external charging operation in the converter control unit.

FIG. 12 is a flowchart showing a processing procedure of the external charging operation in the converter control unit.

DESCRIPTION OF THE REFERENCE SIGNS 10 first power storage unit, 12 and 22 battery monitor unit, 20 second power storage unit, 14 first converter, 24 second converter, 26 and 42 voltage sensor, 28 inverter, 40 charger, 44 current sensor, 46 charge connector, 48 coupling sensor, 50 ECU, 52 engine, 60 charge plug, 62 external power supply, 120 battery voltage sensing unit, 122 temperature sensing unit, 124 and 126 temperature sensor, 128 current sensing unit, 130 current sensor, 502 SOC1 arithmetic unit, 504 Win1 arithmetic unit, 512 SOC2 arithmetic unit, 514 Win2 arithmetic unit, 520 converter control unit, 522 request issuing unit, 524 timer, B11-B1n in battery block, MNL negative bus line, MPL positive bus line

BEST MODES FOR CARRYING OUT THE INVENTION

Embodiments of the invention will be described below with reference to the drawings. In the following description, the same or corresponding portions bear the same reference numbers.

(Schematic Structure of Vehicle)

Figure 1:
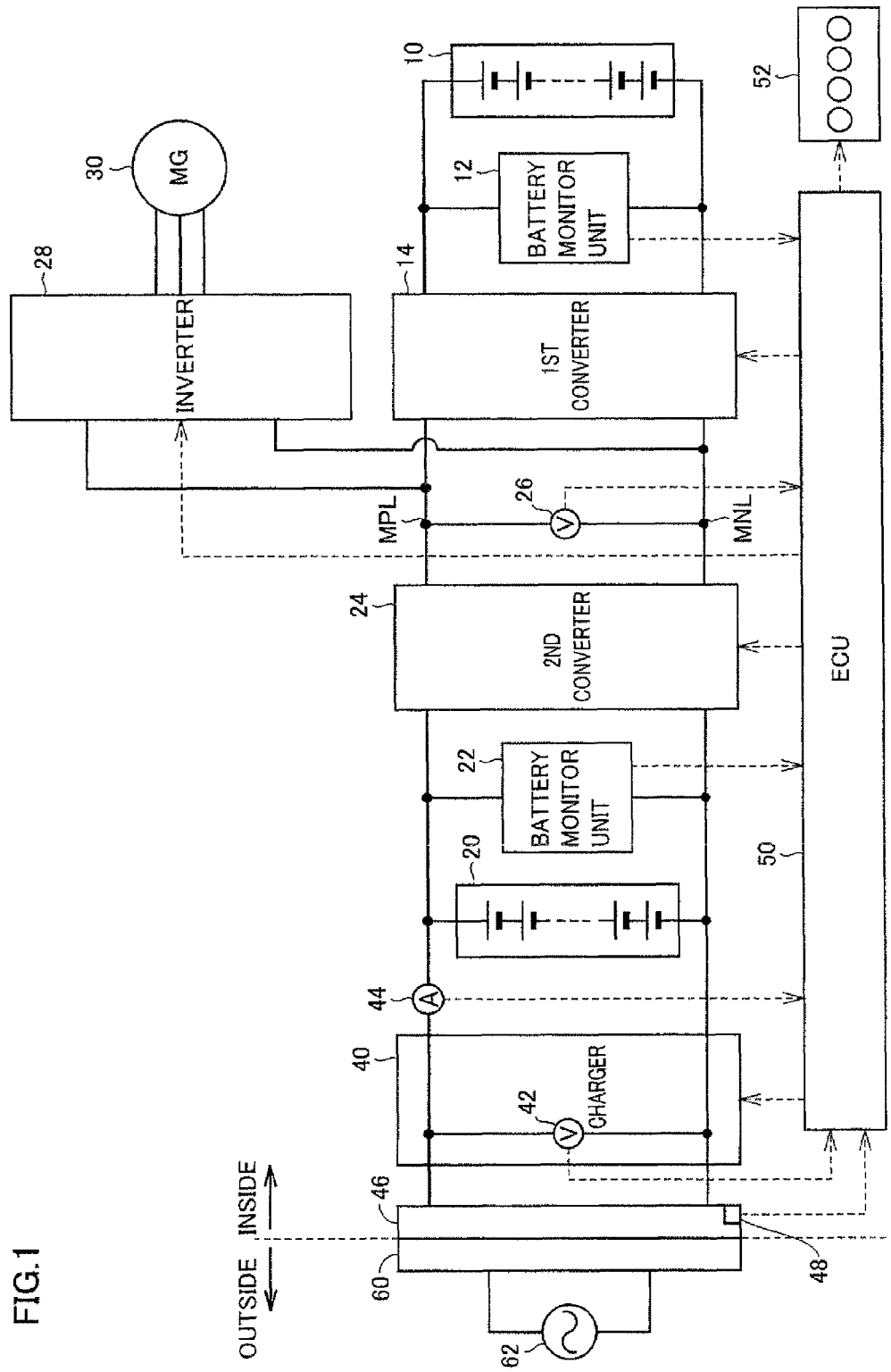
FIG. 1 schematically shows a structure of a vehicle equipped with a power supply system according to an embodiment of the invention.

FIG. 1 schematically shows a structure of a vehicle equipped with a power supply system according to an embodiment of the invention.

Referring to FIG. 1, a vehicle according to an embodiment of the invention is typically a hybrid vehicle, is equipped with an internal combustion engine 52 and a MG (Motor Generator) 30, and is driven by controlling drive powers supplied therefrom to attain an optimum ratio between them. Further, the vehicle is equipped with a plurality of (e.g., two) power storage units 10 and 20 for supplying an electric power to MG 30. When the system of the electrically powered vehicle is active, these power storage units 10 and 20 can be charged by receiving the power produced by the operation of engine 52. When the system of the electrically powered vehicle is not operating, power storage units 10 and 20 can be charged by electrically connecting them to an external power supply 62 via a charger 40, a charge connector 46 and a charge plug 60.

Charge connector 46 forms a coupling mechanism for supplying external power supply 62 such as a commercial power supply to the vehicle. In an external charging operation, charge connector 46 is coupled to charge plug 60 arranged at the vehicle so that external power supply 62 is electrically connected to charger 40 mounted on the vehicle. Thereby, first and second power storage units 10 and 20 are connected to external power supply 62 via charger 40.

Charger 40 may be arranged outside the vehicle. As external power supply 62, an electric power generated by a solar cell panel arranged, e.g., on a roof of a house (not shown) may be used instead of or in addition to the commercial power supply.

The vehicle includes engine 52 and MG 30 as drive power sources. MG 30 is a three-phase AC motor, and is driven by the electric power accumulated in first and second power storage units 10 and 20. MG 30 is supplied with an electric power produced by converting a DC power into an AC power by an inverter 28.

The drive power of MG 30 is transmitted to the wheels (not shown). Thereby, MG 30 assists engine 52, or operates to produce a drive power for running the vehicle. During regenerative braking of the hybrid vehicle, the wheels drive MG 30 so that MG 30 operates as an electric power generator. Thereby, MG 30 operates as a regenerative brake that converts the braking energy into the electric power. The electric power generated by MG 30 is converted by inverter 28 from an AC power into a DC power, and then is stored in first and second power storage units 10 and 20.

Each of first and second power storage units 10 and 20 is an electric power storage element that is chargeable and dischargeable, and is typically formed of a secondary battery such as a lithium ion battery or a nickel hydrogen battery, or a power storage element such as an electrical double layer capacitor. Each of first and second power storage units 10 and 20 is a battery assembly formed of a plurality of electric cells connected together in series, as will be described later.

Battery monitor units 12 and 22 are employed as means for sensing the states of first and second power storage units 10 and 20, and provide the sensed states of the corresponding power storage units to an ECU (Electric Control Unit) 50, respectively.

A first converter 14 that can mutually change the DC voltages is arranged between first power storage unit 10 and inverter 28. First converter 14 mutually steps up or down an input/output voltage of first power storage unit 10 and a line voltage between positive and negative bus lines MPL and MNL. Likewise, a second converter 24 that can mutually covert the DC voltages is arranged between second power storage unit 20 and inverter 28. Second converter 24 mutually steps up or down an input/output voltage of second power storage unit 20 and the line voltage between positive and negative bus lines MPL and MNL. Thus, first and second converters 14 and 24 are connected in parallel to the power line pair, i.e., positive and negative bus lines MPL and MNL. The step-up and step-down operations by converters 14 and 24 are controlled according to a switching instruction from ECU 50.

A voltage sensor 26 is arranged between positive and negative bus lines MPL and MNL, and senses the line voltage between them for providing a sensed value to ECU 50. A voltage sensor 42 is arranged inside charger 40 for sensing a voltage supplied from external power supply 62 and providing a sensed value to ECU 50. A current sensor 44 senses a value of a charge current supplied from charger 40 to first and second power storage units 10 and 20, and provides a sensed value to ECU 50.

ECU 50 is primarily formed of a CPU (Central Processing Unit), a storage unit such as a RAM (Random Access Memory) and a ROM (Read Only Memory), and an input/output interface. The CPU reads out a program prestored, e.g., in the ROM to the RAM, and executes it so that ECU 50 executes the control for the vehicle running and the external charging.

ECU 50 calculates a state of charge (which may be simply referred to as an "SOC" hereinafter) of each of first and second power storage units 10 and 20. The SOC can be represented in an absolute value (e.g., in units of [A·h]) of quantity of charges in power storage unit. In this specification, the SOC is represented as a ratio (0%-100%) of the quantity of charges with respect to the charge capacity of the power storage unit. Structures that calculate the SOCs of power storage units 10 and 20 can be implemented by various known techniques, and therefore specific structures for such calculation are not described.

As the structure for externally charging first and second power storage units 10 and 20, the vehicle further includes charge connector 46 and charger 40. For externally charging first and second power storage units 10 and 20, charge connector 46 is coupled to charge plug 60 so that external power supply 62 supplies a power to charger 40. Charge connector 46 includes a coupling sensor 48 for sensing a state of coupling between charge plug 60 and charge connector 46. ECU 50 receives a coupling signal from coupling sensor 48, and senses therefrom the state allowing the charging by the external power supply.

In this specification, "the state allowing the charging by the external power supply" representatively means a state in which charge connector 46 is physically fitted into charge plug 60. Instead of the structure shown in FIG. 1, such a structure may be employed that an electric power is supplied by electromagnetically coupling the external power supply and the vehicle without making contact between them, and more specifically that primary and secondary coils are arranged on the external power supply side and the vehicle side, respectively, and the electric power supply is performed by using a mutual inductance between the primary and secondary coils. In this structure, "the state allowing the charging by the external power supply" means a state in which the primary and secondary coils are relatively positioned.

Charger 40 is a device for receiving the power from external power supply 62 and performing the external charging on first and second power storage units 10 and 20. Charger 40 converts the power supplied from external power supply 62 into a power suitable for charging power storage units 10 and 20. More specifically, charger 40 includes a voltage converting unit for converting the voltage supplied from external power supply 62 into the voltage suitable for charging power storage units 10 and 20, and a current controller that produces a DC voltage by rectifying the AC voltage converted by the above voltage converting unit, and controls the charging current supplied to power storage units 10 and 20 according to a charging current instruction provided from ECU 50. Instead of these structures, charger 40 may be implemented, e.g., by an AC-DC switching regulator.

Particularly, ECU 50 according to this embodiment determines, based on frequencies of the charging/discharging operations of power storage units 10 and 20, whether it is necessary to issue reset requests (which may also be referred to as "SOC1 reset request" and "SOC2 reset request" hereinafter) to first and second power storage units 10 and 20, respectively, or not, When ECU 50 determines that the SOC of power storage unit 10 or 20 is to be reset, it executes the operation of resetting the SOC when the state allowing the charging by the external power supply is attained.

More specifically, ECU 50 controls the corresponding converter (e.g., first converter 14) to discharge the power storage unit (e.g., first power storage unit 10) to be reset, and controls the corresponding converter (e.g., second converter 24) so that the remaining power storage unit (e.g., second power storage unit 20) may be charged with the discharge current discharged from at least the power storage unit to be reset, i.e., the reset target. When the chargeable current of the remaining power storage unit is larger than the discharge current discharged from the charging unit to be reset, charger 40 may supply the charging current for compensating for a difference between them. The presence/absence of reset requests for power storage units 10 and 20 may be determined based on the frequencies of the charging/discharging operations of them, respectively.

ECU 50 resets the SOC of the power storage unit to be reset to a reference value based on the voltage of the above power storage unit to be reset, More specifically, when the voltage value of the power storage unit to be reset becomes lower than the predetermined reference voltage, ECU 50 resets the SOC to the reference value.

This reference value may be preset based on characteristic values of the power storage units, or may be dynamically set according to a state of use of the battery.

By resetting the SOC of each power storage unit with a predetermined frequency, it is possible to eliminate an influence of the sensing errors in battery monitor units 12 and 22, and the SOCs can be estimated precisely.

When the power storage unit to be reset is reset to attain the predetermined reset value of the SOC, ECU 50 performs the external charging, and specifically charges the power storage unit to be reset with the charging current supplied from charger 40.

The correlation between the embodiment of the invention shown in FIG. 1 and the present invention is as follows. First and second power storage units 10 correspond to "a plurality of power storage mechanisms", first and second converters 14 and 24 correspond to "a plurality of voltage converting units", positive and negative bus lines MPL and MNL correspond to "a power line pair", and charger 40 corresponds to a "charger".

(Control Structure)

Figure 2:
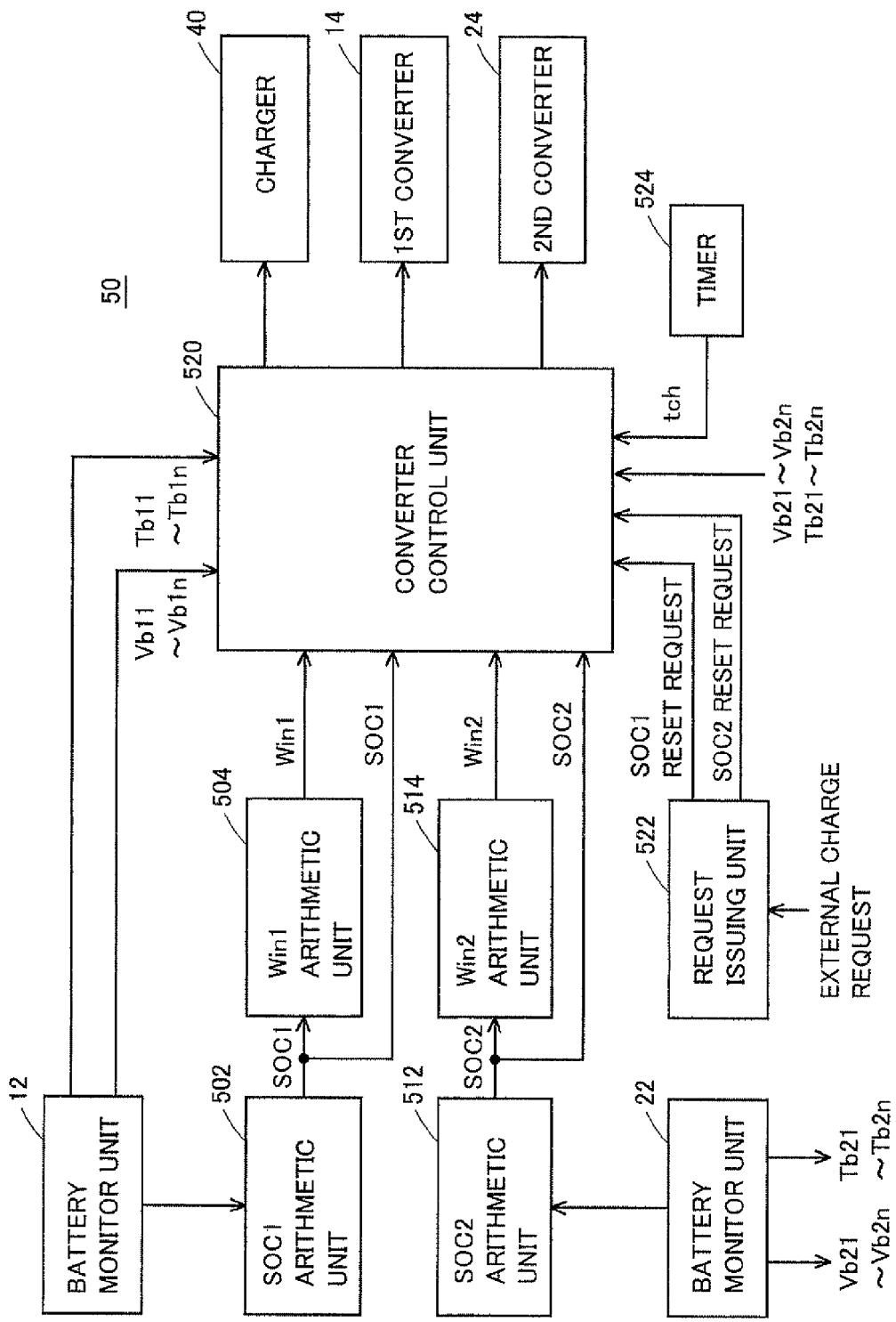
FIG. 2 is a block diagram showing a control structure of an ECU according to the embodiment of the invention.

Referring to FIG. 2 and, description will now be given on the control structure for implementing the external charging operation in the power supply system according to the embodiment.

FIG. 2 is a block diagram showing a control structure of ECU 50 according to the embodiment of the invention. In a typical example, each function block shown in FIG. 2 is implemented by executing a prestored program by ECU 50. However, a part or all of these functions may be implemented by dedicated hardware.

Referring to FIG. 2, ECU 50 includes, as its functions, an SOC1 arithmetic unit 502 calculating an SOC1 of first power storage unit 10, an SOC2 arithmetic unit 512 calculating an SOC2 of second power storage unit 20, a Win1 arithmetic unit 504 calculating a charge-allowed power Win1 of first power storage unit 10 based on SOC1 of first power storage unit 10, a Win2 arithmetic unit 514 calculating a charge-allowed power Win2 of SOC2 of second power storage unit 20 based on second power storage unit 20, a converter control unit 520 and a request issuing unit 522.

Request issuing unit 522 issues reset requests to power storage units 10 and 20 based on the frequencies of charging operations of power storage units 10 and 20, respectively. Typically, request issuing unit 522 determines whether the reset request is to be issued or not, based on a total number of starts of the external charging and a distance traveled. More specifically, it totalizes the signals of starting the external charging based on the coupling signal provided from coupling sensor 48 (FIG. 1). When the total number thus obtained exceeds a predetermined threshold, or when the distance traveled exceeds a predetermined threshold, request issuing unit 522 determines that the error due to the external or internal charging may exert a large influence, and issues the reset request.

SOC1 arithmetic unit 502 calculates SOC1 of first power storage unit 10 by a method to be described later, based on the battery voltage, battery temperature and charge/discharge currents monitored by battery monitor unit 12. Win1 arithmetic unit 504 calculates charge-allowed power Win1 based on the calculated SOC1 of first power storage unit 10.

SOC2 arithmetic unit 512 calculates SOC2 of second power storage unit 20 by a method to be described later, based on the battery voltage, battery temperature and charge/discharge currents monitored by battery monitor unit 22. Win2 arithmetic unit 514 calculates charge-allowed power Win2 based on the calculated SOC2 of second power storage unit 20. Charge-allowed powers Win1 and Win2 are limit values of the charge power at various points in time, and these limit values are defined by chemical reactive limits.

Figure 3:
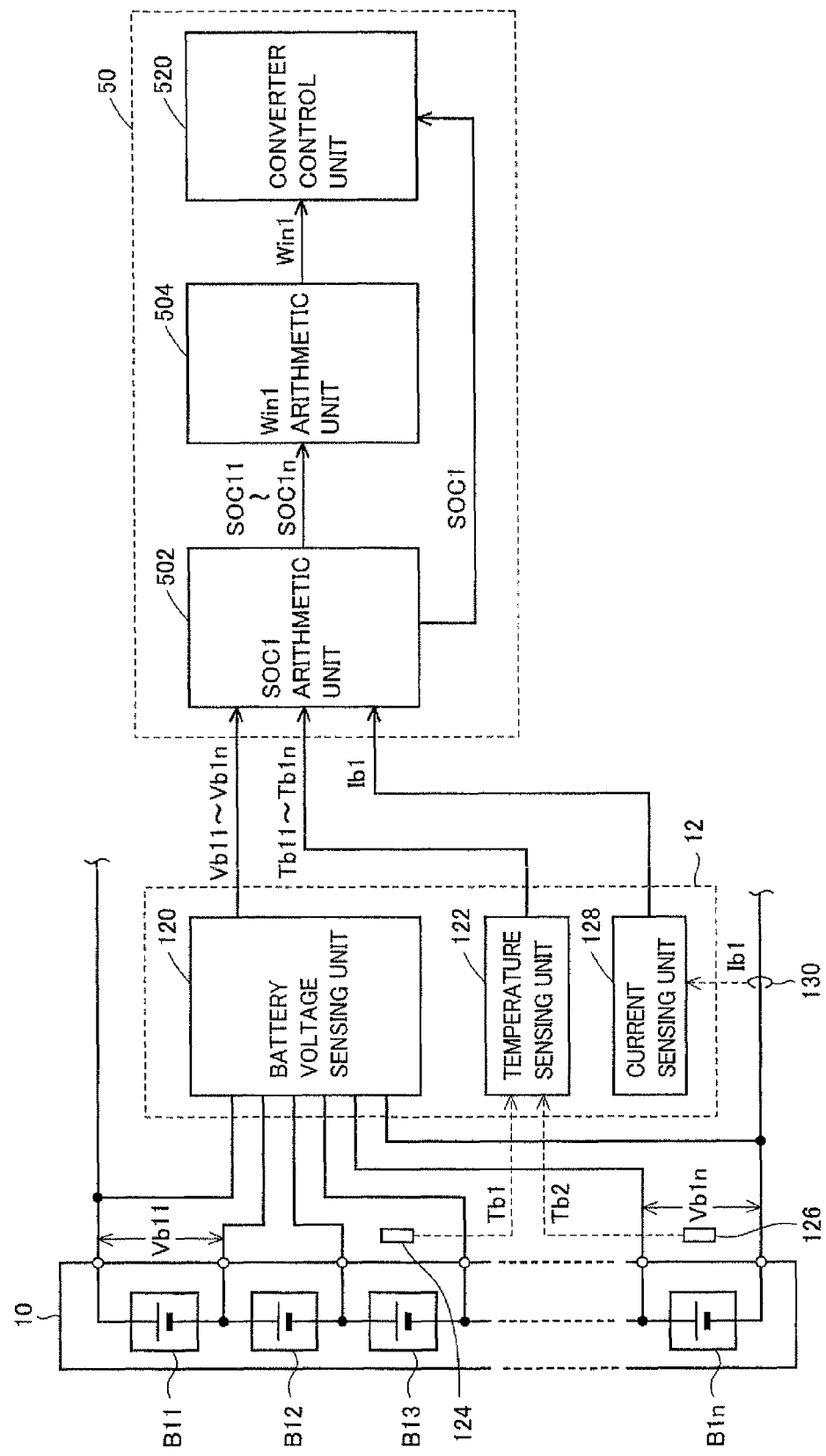
FIG. 3 is a block diagram showing a specific control structure in SOC1 and Win1 arithmetic units shown in FIG. 2.

FIG. 3 is a block diagram showing a specific control structure in SOC1 and Win1 arithmetic units 502 and 504 shown in FIG. 2.

Referring to FIG. 3, battery monitor unit 12 includes, as means for sensing the state of first power storage unit 10, a battery voltage sensing unit 120, a temperature sensing unit 122, a current sensing unit 128, temperature sensors 124 and 126, and a current sensor 130.

As already described, first power storage unit 10 is the battery assembly formed of the plurality of electric cells connected in series. First power storage unit 10 is divided into battery blocks B11-B1$n$ of n (n is a natural number) in number each formed of the several electric cells connected in series. Although not shown, second power storage unit 20 has a similar structure, and is divided into battery blocks B21-B2$n$ of n in number.

Battery voltage sensing unit 120 senses battery voltages Vb11-Vb1$n$ of battery blocks B11-B1$n$, and provides sensed battery voltages Vb11-Vb1$n$ n to SOC1 arithmetic unit 502.

Temperature sensing unit 122 senses internal temperatures Tb1 and Tb2 of a plurality of portions of first power storage unit 10 based on sensor outputs provided from the plurality of temperature sensors 124 and 126 attached to these portions, respectively. Temperature sensing unit 122 calculates battery temperatures Tb11-Tb1$n$ of the respective battery blocks based on internal temperatures Tb1 and Tb2 thus sensed, and provides a result of this calculation to SOC1 arithmetic unit 502.

Current sensing unit 128 senses a charge/discharge current Ib1 of first power storage unit 10 flowing through battery blocks B11-B1$n$ in based on the sensor output of current sensor 130, and provides the sensed current to SOC1 arithmetic unit 502.

In ECU 50, SOC1 arithmetic unit 502 calculates SOC11-SOC1$n$ for battery blocks B11-B1$n$ based on battery voltages Vb11-Vb1$n$, charge/discharge current Ib1 and battery temperatures Tb11-Tb1$n$ provided from battery monitor unit 12, respectively.

Various well-known techniques can be used for the structure calculating the SOC of each battery block. For example, SOC1 arithmetic unit 502 derives the SOC by adding a correction SOC calculated from an integrated value of charge/discharge current Ib1 to a provisional SOC calculated from an open-circuit voltage value. More specifically, SOC1 arithmetic unit 502 calculates open-circuit voltage values for respective battery blocks from charge/discharge current Ib1 and battery voltages Vb11-Vb1$n$ at each point in time, and calculates the provisional SOC of each battery block by applying the open-circuit voltage value thus calculated to the reference charge/discharge characteristics that are experimentally obtained in advance for representing a relationship between the SOC and the open-circuit voltage value in the reference state of the battery block. Further, SOC1 arithmetic unit 502 integrates charge/discharge current Ib1 to calculate the correction SOC, and obtains the SOC by adding the provisional SOC to this correction SOC.

SOC1 arithmetic unit 502 provides SOC11-SOC1$n$ derived for battery blocks B11-B1$n$ to Win1 arithmetic unit 504. Further, SOC1 arithmetic unit 502 determines or specifies the smallest SOC among derived SOC11-SOC1$n$ as SOC1 of first power storage unit 10, and provides it to converter control unit 520.

When Win1 arithmetic unit 504 receives SOC11-SOC1$n$ derived for the respective battery blocks, it specifies the largest SOC among SOC11-SOC1$n$ as SOC1 of first power storage unit 10, and derives charge-allowed power Win1 based on the determined SOC1. It provides charge-allowed power Win1 thus derived to converter control unit 520.

Thus, SOC1 provided from SOC1 arithmetic unit 502 is different from SOC1 used by Win1 arithmetic unit 504 for deriving charge-allowed power Win1. The smallest value among SOC11-SOC1$n$ is specified as SOC1 of first power storage unit 10 for the purpose of keeping the discharge-allowed power of the battery block of the smallest SOC and thereby suppressing the overdischarged state of this battery block. Conversely, for deriving charge-allowed power Win1, the largest value among SOC11-SOC1$n$ is specified as SOC1 for the purpose of keeping the charge-allowed power of the battery block of the largest SOC and thereby suppressing the overcharged state of this battery block.

Win1 arithmetic unit 504 has stored a map of the charge-allowed power in which SOC1 and the battery temperature of first power storage unit 10 experimentally obtained in advance are defined as parameters, and derives charge-allowed power Win1 at various points in time based on the calculated SOC1 and battery temperature. The map defining the charge-allowed power may contain parameters other than the SOC and the battery temperature, such as a degree of deterioration of the power storage unit.

SOC1 arithmetic unit 502 and Win1 arithmetic unit 504 provide SOC1 and Win1 thus derived to converter control unit 520, respectively. Likewise, SOC2 arithmetic unit 512 and Win2 arithmetic unit 514 provide SOC2 and Win2 thus derived to converter control unit 520, respectively.

Referring to FIG. 2 again, converter control unit 520 executes the control of the external charging of power storage units 10 and 20 based on SOC1 and charge-allowed power Win1 of power storage unit 10, SOC2 and charge-allowed power Win2 of power storage unit 20, and the battery states provided from battery monitor units 12 and 22.

More specifically, converter control unit 520 determines, based on charge-allowed powers Win1 and Win2, target charge powers Pin1* and Pin2* in first and second power storage units 10 and 20. Based on target charge powers Pin1* and Pin2* thus determined, converter control unit 520 determines a target supply power PAC* for external power supply 62 (FIG. 1). Based on the power difference between the target charge power in first power storage unit 10 thus determined and the charge power (actual value) of first power storage unit 10, converter control unit 520 controls first converter 14 to charge first power storage unit 10 with a constant current value. Also, based on the power difference between the target charge power in second power storage unit 20 and the charge power (actual value) of second power storage unit 20, converter control unit 520 controls second converter 24 to charge second power storage unit 20 with a constant current value. Further, based on the power difference between target supply power PAC* and a power (actual value) PAC supplied from external power supply 62, converter control unit 520 controls charger 40 to convert the power supplied from external power supply 62 into the power suitable for charging power storage units 10 and 20.

The external charging is effected on power storage units 10 and 20 by controlling first and second converters 14 and 24 as well as charger 40 as described above. The external charging operation ends in response to the fully charged state of power storage units 10 and 20.

However, long-time use of power storage units 10 and 20 causes variations in battery characteristics such as a current, voltage and SOC between the power storage units. Therefore, in a part of the power storage units of which the SOC falls outside an appropriate range, the overcharging may occur during the external charging to deteriorate the battery characteristics. For avoiding such overcharging, it is effective to perform the charging and discharging on each power storage unit independently of the other power storage unit. However, this results in a disadvantage that the control is complicated when the power storage units increase in total number.

Further, variations in battery characteristics occur between the battery blocks in each power storage unit. Therefore, when the charge/discharge management is collectively performed in whole the power storage unit, the overdischarge may occur in a part of the battery blocks having a relative low SOC in the discharging operation. In the charging operation, a part of the battery blocks of a relatively high SOC may be overcharged. The use accompanies by the overcharge and overdischarge deteriorates the battery performance of the power storage unit. Particularly, the influence by variations between the battery blocks is not negligible in the power storage units of the vehicle that includes a relatively large number of battery blocks in total. This makes it difficult to perform sufficient charge/discharge management, and further may reduce the life.

Therefore, when the external charging is being performed on the above power storage units and there is a possibility that one of the battery blocks is overcharged, it is necessary to end immediately the external charging operation without waiting the fully charged state of the power storage unit.

Accordingly, the power supply system according to the embodiment is configured as shown in FIG. 4 from the viewpoint of avoiding the overcharge in each battery block and suppressing the performance deterioration of the power storage units. In this configuration, a plurality of conditions (which may also be referred to as "charge end conditions" hereinafter) for ending the charging of the power storage unit are set in advance, and the external charging ends when any one of these charge end conditions is satisfied.

FIG. 4 illustrates items for managing the end of the external charging and the charge conditions determined for the respective management items.

Referring to FIG. 4, this embodiment employs, e.g., six kinds of charge end conditions. A storage unit of ECU 50 stores these charge end conditions corresponding to the respective management items.

When converter control unit 520 is executing the external charging, ECU 50 determines at every predetermined control cycle whether power storage units 10 and 20 have satisfied the charge end conditions of the respective management items, or not. When power storage units 10 and 20 satisfy one of the charge end conditions, ECU 50 controls first and second converters 14 and 24 as well as charger 40 to end the external charging.

Each of the charge end conditions shown in FIG. 4 is specifically described below.

(1) Charge Management with SOC

First, the first charge end condition is that the SOC of the power storage unit has attained a target value (which may also be referred to as a "target SOC*" hereinafter). Target SOC* is set at every predetermined control cycle based on battery temperatures $Tb11$-$Tb1n$ of battery blocks $B11$-$B1n$ of first power storage unit 10 and battery temperatures $Tb21$-$Tb2n$ of battery blocks $B21$-$B2n$ of second power storage unit 20.

Specifically, converter control unit 520 operates at every control cycle based on battery temperatures $Tb11$-$Tb1n$ and $Tb21$-$Tb2n$ of the respective battery blocks received from battery monitor units 12 and 22, and thereby outputs, as a representative value of the battery temperatures, the battery temperature of the battery block that can be estimated to have the highest possibility of undergoing the overcharging. The purpose of this is to avoid the overcharge in each battery block by collectively performing the charge/discharge management in the whole power storage unit, without performing the independent charge/discharge management of each battery block.

More specifically, converter control unit 520 compares a highest temperature Tb1max among battery temperatures $Tb11$-$Tb1n$ with a highest temperature Tb2max among battery temperatures $Tb21$-$Tb2n$, and sets the higher one as a highest battery temperature Tbmax. Also, converter control unit 520 compares a lowest temperature Tb1min among battery temperatures $Tb11$-$Tb1n$ in with a lowest temperature Tb2min among battery temperatures $Tb21$-$Tb2n$, and sets the lower one as a lowest battery temperature Tbmin. Converter control unit 520 determines whether the highest and lowest battery temperatures Tbmax and Tbmin thus set fall within a predetermined temperature range of (Tb1≤Tb≤Tb2) or not.

When both of highest and lowest battery temperatures Tbmax and Tbmin fall within the predetermined temperature rage, converter control unit 520 employs an average value of ((Tbmax+Tbmin)/2) of these two battery temperatures as a representative value of battery temperature Tb.

Conversely, when highest battery temperature Tbmax exceeds upper limit value Tb2 of the predetermined temperature range, converter control unit 520 employs highest battery temperature Tbmax as the representative value of battery temperature Tb. When lowest battery temperature Tbmin is lower than lower limit value Tb1 of the predetermined temperature range, converter control unit 520 employs lowest battery temperature Tbmin as the representative value of battery temperature Tb.

Then converter control unit 520 sets target SOC* based on battery temperature (representative value) Tb. FIG. 5 shows a relationship between battery temperature Tb and target SOC*.

Referring to FIG. 5, target SOC* is set to a predetermined value X1% when battery temperature Tb falls within the predetermined temperature range. In a region (lower temperature side) where battery temperature Tb is lower than lower limit value Tb1 of the temperature range, target SOC* is set to lower as battery temperature Tb lowers. In a region (higher temperature side) where battery temperature Tb is higher than upper limit value Tb2 of the temperature range, target SOC* is set to lower as battery temperature Tb rises.

Converter control unit 520 has stored a relationship between battery temperature Tb and target SOC* in FIG. 5 as a target SOC setting map (i.e., a map for setting the target SOC) in a storage area (not shown). When converter control unit 520 receives battery temperature Tb at every predetermined control cycle, it extracts the corresponding SOC from the target SOC setting map, and sets it as target SOC*. Converter control unit 520 determines whether one of SOC1 and SOC2 of first and second power storage units 10 and 20 has reached target SOC* or not. When one of SOC1 and SOC2 has reached target SOC*, converter control unit 520 determines that power storage units 10 and 20 have satisfied the first charge end conditions.

In the case where the power supply system according to the embodiment determines that one of the SOCs of power storage units 10 and 20 is to be reset as described above, it will execute the SOC reset operation when the charging operation by the external power supply becomes possible. This eliminates the influence of the sensing errors in battery monitor units 12 and 22 from SOC1 and SOC2 that will be calculated after the execution of the reset operation. Accordingly, after the end of the reset operation, it is necessary to set target SOC* based on SOC1 and SOC2 thus reset.

Converter control unit 520 is configured as follows. Apart from the relationship shown in FIG. 5, converter control unit 520 holds the relationship between battery temperature Tb and target SOC* obtained after the reset operation as shown in FIG. 6, sets one of them depending on execution/nonexecution of the reset operation and sets the selected one as target SOC*.

Figure 6:
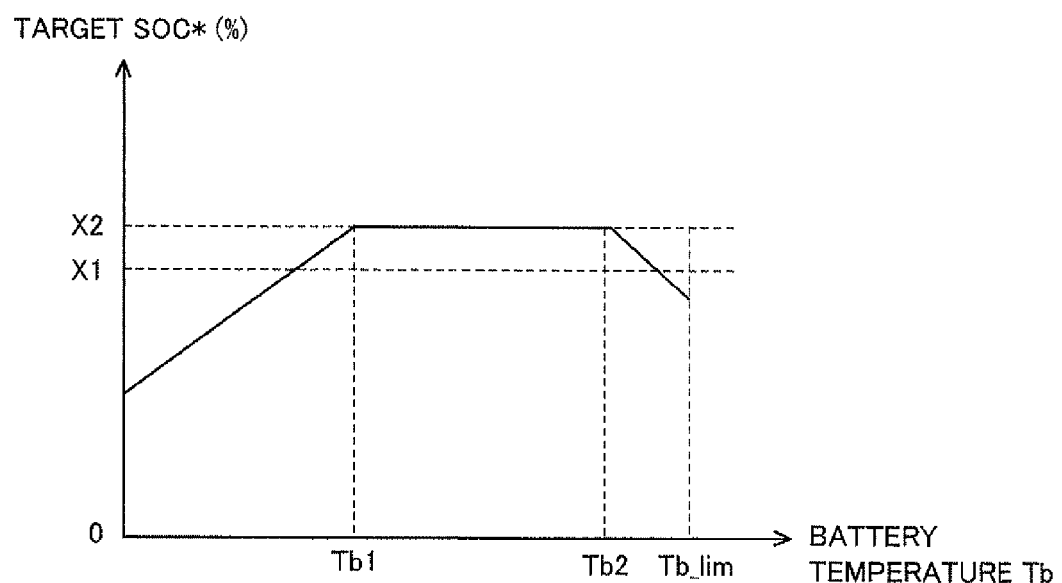
FIG. 6 shows a relationship between a battery temperature and an SOC target value after an end of a reset operation.

FIG. 6 shows a relationship between battery temperature Tb and target SOC* exhibited after the end of the reset operation.

Referring to FIG. 6, target SOC* is set to a predetermined value X2% when battery temperature Tb falls within a predetermined temperature range. This predetermined value X2 is prepared by eliminating the influence of the sensing errors in battery monitor units 12 and 22 from predetermined value X1 in FIG. 5. In a region (lower temperature side) where battery temperature Tb is lower than lower limit value Tb1 of the temperature range, battery temperature Tb is set to lower as battery temperature Tb lowers. In a region (higher temperature side) where battery temperature Tb exceeds upper limit value Tb2 of the temperature range, battery temperature Tb is set to lower as battery temperature Tb rises.

Converter control unit 520 prestores a relationship between battery temperature Tb and target SOC* in FIG. 6 in a storage area (not shown) as the target SOC setting map to be used after the reset operation. When converter control unit 520 receives battery temperature Tb at every predetermined control cycle, it extracts the corresponding SOC from the target SOC setting map and sets it as target SOC*. In the following description, the target SOC setting map in FIG. 5 will be referred to as an "ordinary operation target SOC setting map", and the target SOC setting map in FIG. 6 will be referred to as a "reset operation target SOC setting map" for the sake of simplicity.

(2) Charge Management Based on the Charge Time

Returning to FIG. 4, the second charge end condition is that the charge times of power storage units 10 and 20 reach an estimated full-charge time tch*. At the start of the external charging, estimated full-charge time tch* is calculated from the following equation based on a difference between the SOC in the fully charged state (e.g., the SOC of 100%) and the SOC of power storage units 10 and 20:

$$tch^* = (100 - SOC) \times Qfull / Pb \quad (1)$$

where Qfull indicates a full charge capacity of power storage units 10 and 20, and Pb is a charge power per unit time.

When converter control unit 520 senses from a coupling signal provided from coupling sensor 48 (FIG. 1) that the charging by the external power supply becomes possible, converter control unit 520 calculates estimated full-charge time tch* for each of first and second power storage units 10 and 20.

Figure 7:
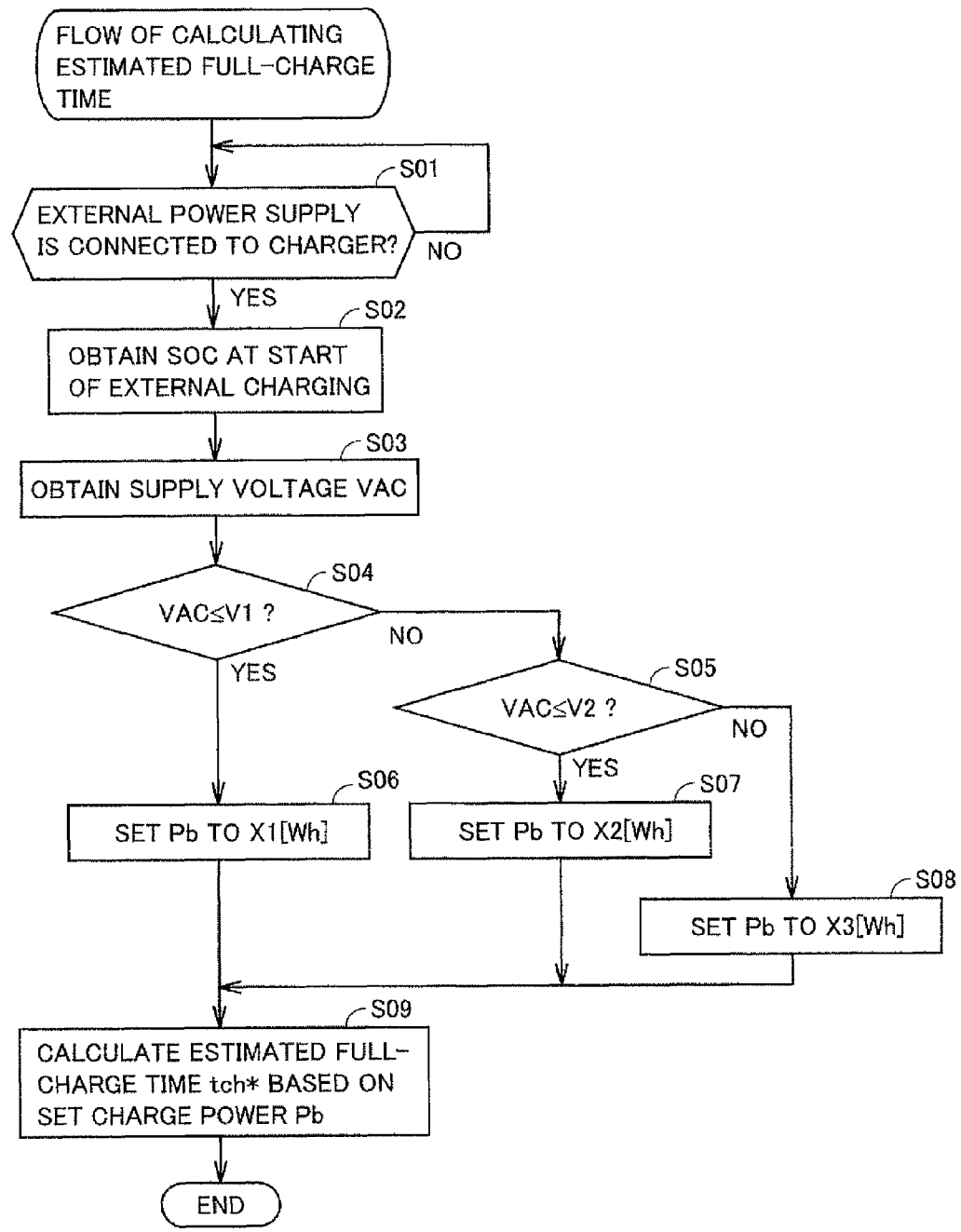
FIG. 7 is a flowchart showing a procedure of arithmetic processing of an estimated full-charge time according to the embodiment of the invention.

FIG. 7 is a flowchart showing a procedure of arithmetic processing of an estimated full-charge time according to the embodiment of the invention. The processing in each step shown in FIG. 7 is implemented by ECU 50 (FIG. 1) functioning as each control block shown in FIG. 2.

Referring to FIG. 7, converter control unit 520 determines, based on the coupling signal from coupling sensor 48 (FIG. 1), whether external power supply 62 of the vehicle is coupled to charger 40 or not (step S01).

When external power supply 62 is not connected to charger 40 (NO in step S01), the process returns to the initial step.

Conversely, when external power supply 62 is connected to charger 40 (YES in step S01), converter control unit 520 determines that the charging by the external power supply is allowed, and obtains SOC1 and SOC2 of the first and second power storage units 10 and 20 from SOC1 and SOC2 arithmetic units 501 and 512, respectively.

Further, converter control unit 520 obtains the sensed value of a supply voltage VAC of external power supply 62 from voltage sensor 42 (FIG. 1) arranged inside charger 40 (step S03). Based on the obtained voltage level of supply voltage VAC, converter control unit 520 sets charge power Pb per unit time according to the equation (1).

In this embodiment, charger 40 and converters 14 and 24 are controlled to charge corresponding power storage units 10 and 20 with a constant current value. However, a voltage drop with respect to a rate voltage occurs in supply voltage VAC of external power supply 62. Therefore, charge power Pb per unit time is adjusted according to the voltage drop of supply voltage VAC so that estimated full-charge time tch* can be accurately calculated.

Specifically, converter control unit 520 first determines whether obtained supply voltage VAC is equal to or smaller than a predetermined threshold V1 or not (step S04). When supply voltage VAC is equal to or smaller than predetermined threshold V1 (YES in step S04), converter control unit 520 sets charge power Pb per unit time to a predetermined value X1[Wh] (step S06).

When obtained supply voltage VAC is higher than predetermined first threshold V1 (NO in step S04), converter control unit 520 determines whether supply voltage VAC is equal to or smaller than a second threshold V2 higher than first threshold V1, or not (step S05). When supply voltage VAC is equal to or smaller than second threshold V2 (YES in step S05), converter control unit 520 sets charge power Pb per unit time to a predetermined value X2[Wh].

When obtained supply voltage VAC is higher than second threshold V2 (NO in step S05), converter control unit 520 sets charge power Pb per unit time to a predetermined value X3[Wh] (step S08).

Converter control unit 520 substitutes charge amount Pb per unit time that is set in each of steps S06-S08 into the equation (1), and thereby calculates estimated full-charge time tch* (step S09).

At the start of the external charging, converter control unit 520 calculates estimated full-charge time tch* of each of first and second power storage units 10 and 20 by the foregoing method, and starts an operation of measuring a charge time tch by a timer 524 (FIG. 2). At every predetermined control cycle, converter control unit 520 determines whether charge time tch has reached estimated full-charge time tch* or not. When charge time tch has reached estimated full-charge time tch* in one of power storage units 10 and 20, converter control unit 520 determines that power storage units 10 and 20 have satisfied the second charge end condition.

(3) Management Based on Battery Temperature

Returning to FIG. 4, the third charge end condition is that battery temperature Tb of power storage units 10 and 20 is at a predetermined allowed temperature Tb_lim. Abnormal heat generation of power storage units 10 and 20 may occur due to continuation of the charging, and predetermined allowed temperature Tb_lim is set as the battery temperature that can prevent such abnormal heat generation.

Converter control unit 520 sets the representative value of battery temperature Tb in a method similar to that described in the above item (1), and particularly converter control unit 520 employs, as the representative value of battery temperature Tb, the battery temperature of the battery block that is estimated to have the highest possibility of undergoing the overcharging, at every predetermined control cycle based on battery temperatures Tb11-Tb1$n$ and Tb21-Tb2$n$ of respective battery blocks received from battery monitor units 12 and 22. Therefore, converter control unit 520 determines at every predetermined control cycle whether battery temperature Tb (representative value) is equal to or higher than predetermined allowed temperature Tb_lim or not. When battery temperature Tb is equal to or higher than allowed temperature Tb_lim, converter control unit 520 determines that power storage units 10 and 20 satisfy the third charge end condition.

(4) Management by Changes in Battery Temperature

The fourth charge end condition is that battery temperature Tb of power storage units 10 and 20 has risen from a temperature at the start of the external charging by a rise temperature ΔTb equal to or higher than a predetermined reference rise temperature ΔTb_std that is set in advance. Predetermined reference rise temperature ΔTb_std is preset to the battery temperature that can prevent the abnormal heating of power storage units 10 and 20 that may be caused by rapid rising of the battery temperature.

Converter control unit 520 sets battery temperature Tb used for sensing rise temperature ΔTb in a method similar to that described in the above item (1), and particularly converter control unit 520 employs, as the representative value of battery temperature Tb, the battery temperature of the battery block that is estimated to have the highest possibility of undergoing the overcharging, at every predetermined control cycle based on battery temperatures Tb11-Tb1$n$ and Tb21-Tb2$n$ of respective battery blocks received from battery monitor units 12 and 22.

Converter control unit 520 determines, at every predetermined control cycle, whether rise temperature ΔTb of battery temperature Tb (representative value) is equal to or higher than predetermined reference rise temperature ΔTb_std or not. When rise temperature ΔTb of battery temperature Tb is equal to or higher than reference rise temperature ΔTb_std, converter control unit 520 determines that power storage units 10 and 20 satisfy the fourth charge end condition.

(5) Management by Battery Voltage

The fifth charge end condition is that battery voltages (charge voltages) Vbat1 and Vbat2 of power storage units 10 and 20 attain a predetermined battery voltage upper-limit value Vb_up that is preset.

Battery voltage Vbat1 is a voltage between the power lines connected to first power storage unit 10 and first converter 14, respectively, and is sensed by battery monitor unit 12. Battery voltage Vbat2 is a voltage between the power lines connected to second power storage unit 20 and second converter 24, respectively, and is sensed by battery monitor unit 22. Since the SOC of the power storage unit and the battery voltage of the power storage unit exhibits a certain relationship, the charge management can be performed to attain the fully charged state by measuring the battery voltage of the power storage unit and referring to the relation characteristics that are experimentally obtained in advance.

Battery voltage upper-limit value Vb_up is set based on battery temperature Tb of power storage units 10 and 20 at every predetermined control cycle based on battery temperature Tb of power storage units 10 and 20. Converter control unit 520 sets battery temperature Tb in a method similar to that described in the above item (1), and particularly converter control unit 520 employs, as the representative value of battery temperature Tb, the battery temperature of the battery block that is estimated to have the highest possibility of undergoing the overcharging, at every predetermined control cycle based on battery temperatures Tb11-Tb1$n$ and Tb21-Tb2$n$ of respective battery blocks received from battery monitor units 12 and 22.

Figure 8:
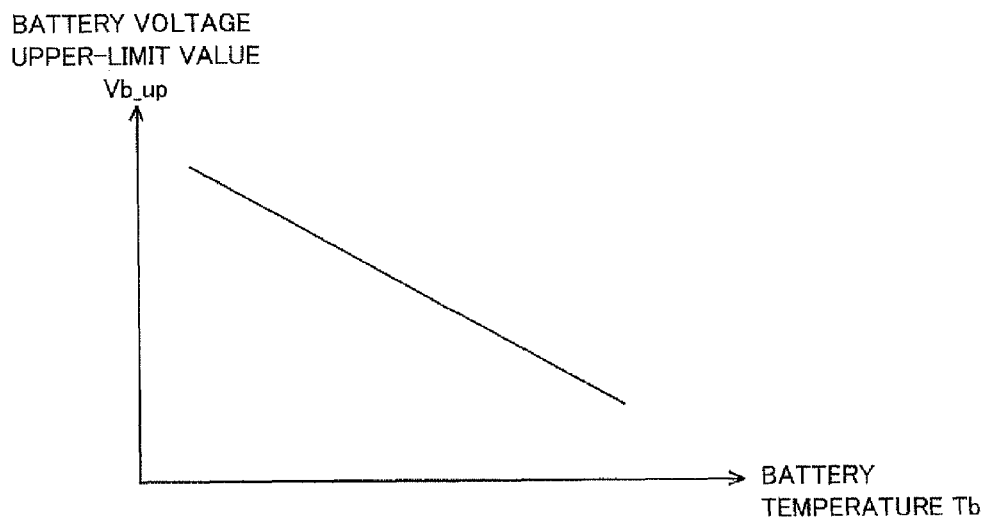
FIG. 8 shows a relationship between a battery temperature and a battery voltage upper-limit value.

FIG. 8 shows a relationship between battery temperature Tb and battery voltage upper-limit value Vb_up.

Referring to FIG. 8, battery voltage upper-limit value Vb_up is set to lower as battery temperature Tb rises. Converter control unit 520 has stored a relationship between battery temperature Tb and battery voltage upper-limit value Vb_up in FIG. 8 in a storage area (not shown) as a battery voltage upper-limit setting map. When converter control unit 520 receives battery temperature Tb at every predetermined control cycle, it extracts the corresponding voltage value from the battery voltage upper-limit setting map, and sets it as battery voltage upper-limit value Vb_up. Converter control unit 520 determines whether battery voltages Vbat1 and Vbat2 of first and second power storage units 10 and 20 have reached battery voltage upper-limit value Vb_up or not. When one of battery voltages Vbat1 and Vbat2 has reached battery voltage upper-limit value Vb_up, converter control unit 520 determines that power storage units 10 and 20 have satisfied the fifth charge end conditions.

(6) Management by Charge-Allowed Power

Returning to FIG. 4, the last, i.e., sixth charge end condition is that a total charge-allowed power value (=Win1+Win2) that is a total of charge-allowed powers Win1 and Win2 of first and second power storage units 10 and 20 is equal to or smaller than supply power PAC supplied from external power supply 62.

In this embodiment, charge-allowed powers Win1 and Win2 of power storage units 10 and 20 are derived by correspond Win arithmetic units based on the largest SOC among those of the respective battery blocks derived by the SOC arithmetic unit, as already described with reference to FIG. 3. Conversely, the SOC of each of power storage units 10 and 20 is specified by selecting the smallest SOC among those of the corresponding battery blocks derived from the corresponding SOC arithmetic unit.

Figure 9:
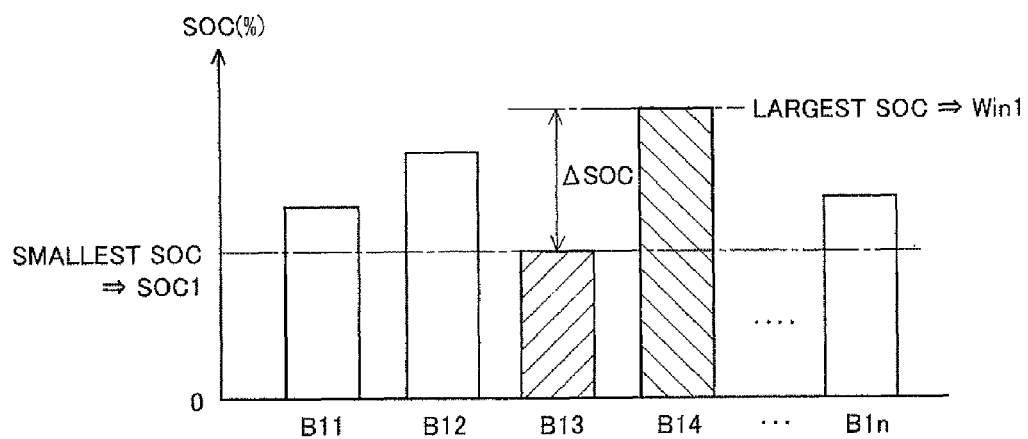
FIG. 9 shows an example of SOCs of respective battery blocks.

More specifically, referring to FIG. 9, variations in SOC are present in battery blocks B11-B1$n$ of n in number forming the power storage unit (e.g., first power storage unit 10) due to use for a long time. Therefore, when the charge/discharge management is collectively performed in the whole power storage unit, battery block B13 of the smallest SOC may be overdischarged in the discharging operation. In the charging operation, battery block B14 of the largest SOC may be overcharged. Independent charge/discharge management of each battery block is effective at preventing these overcharging and overdischarging. However, battery blocks B11-B1$n$ are connected in series so that the control becomes complicated and is actually difficult.

Accordingly, for the SOC to be used as the index for the charge/discharge management, the SOC of battery block B13, i.e., the smallest SOC is specified as SOC1 of first power storage unit 10. Thereby, the overdischarged state of battery block B13 can be suppressed by complying with the discharge-allowed power of battery block B13.

Further, the largest SOC, i.e., the SOC of battery block B14 is specified as SOC1 for deriving charge-allowed power Win1, whereby the overcharging of the battery block can be suppressed by complying with the charge-allowed power of battery block B14.

When converter control unit 520 receives charge-allowed powers Win1 and Win2 from Win1 and Win2 arithmetic units 504 and 514, respectively, it obtains a total value thereof, i.e., the total charge-allowed power value. Converter control unit 520 obtains an actual value of the power supplied from external power supply 62 based on a product of a supplied voltage VAC of external power supply 62 sensed by voltage sensor 42 and the charge current value obtained by current sensor 44. Converter control unit 520 determines a relationship in magnitude between the total value of the charge-allowed power and the actual value of the supply power. When the total value of the charge-allowed power is equal to or smaller than the actual value of the supply power, converter control unit 520 determines that power storage units 10 and 20 have satisfied the sixth charge end condition.

As described above, each of power storage units 10 and 20 calculates the charge-allowed power based on the largest SOC of the battery block (i.e., battery block in the highest state of charge), and will ends the external charging when the total value of the charge-allowed power becomes equal to or smaller than the actual value of the power supplied from external power supply 62. Thereby, the overcharge of each block can be reliably suppressed in each power storage unit. This can avoid the deterioration of the battery characteristics and others of the battery block.

Returning to FIG. 4, converter control unit 520 determines at every predetermined control cycle during the external charging whether power storage units 10 and 20 have satisfied the first to sixth charge end conditions already described or not. When power storage units 10 and 20 have satisfied one of the first to sixth charge end conditions, converter control unit 520 controls first and second converters 14 and 24, and charger 40 to end the external charging.

(Control Flow)

Finally, with reference to FIGS. 10 to 13, description will be given on the control structure for implementing the external charging operation by converter control unit 520.

FIG. 10 is a flowchart showing a processing procedure for starting the external charging operation in converter control unit 520. The processing in each step shown in FIG. 10 is implemented by ECU 50 (FIG. 1) functioning as the corresponding control block shown in FIG. 2.

Referring to FIG. 10, converter control unit 520 determines, based on the coupling signal provided from coupling sensor 48 (FIG. 1), whether external power supply 62 of the vehicle is coupled to charger 40 or not (step S11).

When external power supply 62 is not connected to charger 40 (NO in step S11), the process returns to the initial step.

Conversely, when external power supply 62 is connected to charger 40 (YES in step S11), converter control unit 520 determines that the charging by the external power supply is allowed, and determines whether request issuing unit 522 has issued the reset request for power storage units 10 and 20, or not (step S12). When request issuing unit 522 has not issued the reset request (NO in step S12), converter control unit 520 calculates battery temperature Tb (representative value) of power storage units 10 and 20 by the foregoing method based on battery temperatures Tb11-Tb1$n$ of the respective battery blocks of first power storage unit 10 and battery temperatures Tb21-Tb2$n$ of the respective battery blocks of second power storage unit 20 (step S20). Further, converter control unit 520 performs the processing according to the flowchart in FIG. 7, and calculates estimated full-charge time tch* for each of power storage units 10 and 20 (step S21).

Conversely, when request issuing unit 522 has issued the reset request (YES in step S12), converter control unit 520 determines whether the reset operation of the SOC is completed in the power storage unit to be reset, or not (step S13). When the reset operation is not completed (NO in step S13), the processing is kept in step S13. Thus, converter control unit 520 waits for the completion of the reset operation.

When the reset operation is completed (YES in step S13), converter control unit 520 calculates battery temperature Tb (representative value) of power storage units 10 and 20 based on battery temperatures Tb11-Tb1$n$ of the respective battery blocks of first power storage unit 10 and battery temperatures Tb21-Tb2$n$ of the respective battery blocks of second power storage unit 20 (step S14). Further, converter control unit 520 performs the processing according to the flowchart of FIG. 7 based on the reset SOC, and calculates estimated full-charge time tch* for each of power storage units 10 and 20 (step S15).

Further, converter control unit 520 determines whether the charge current value provided from current sensor 44 is equal to or larger than the predetermined value or not (step S16). This predetermined value is set suitable for charging power storage units 10 and 20 with the charge current of the constant current value supplied from external power supply 62. When the charge current value is equal to or larger than the predetermined value (NO in step S16), the process proceeds to step S18.

Conversely, when the charge current value of current sensor 44 is smaller than the predetermined value (YES in step S16), converter control unit 520 performs the processing according to the flowchart of FIG. 7 based on the charge current value of current sensor 44, and recalculates estimated full-charge time tch* for each of power storage units 10 and 20 (step S17).

Converter control unit 520 starts the external charging of power storage units 10 and 20 (step S18). Specifically, converter control unit 520 controls first and second converters 14 and 24 to charge power storage units 10 and 20 with the constant current value, respectively. Further, converter control unit 520 starts to measure charge time tch by a timer (step S19).

FIGS. 11 and 12 are flowcharts showing processing procedures of the external charging operation by converter control unit 520. The processing in each of the steps shown in FIGS. 11 and 12 can be implemented by ECU 50 (FIG. 1) functioning at every predetermined control cycle as the corresponding control block shown in FIG. 2.

Referring to FIG. 11, when the external charging of power storage units 10 and 20 starts according to the processing procedures in FIG. 10, converter control unit 520 first obtains battery temperatures Tb11-Tb1$n$ of battery blocks B11-B1$n$ of first power storage unit 10 from temperature sensing unit 122 (FIG. 3) of battery monitor unit 12 (step S31). Converter control unit 520 obtains battery temperatures Tb21-Tb2$n$ of battery blocks B21-B2$n$ of second power storage unit 20 from temperature sensing unit 122 of battery monitor unit 22 (step S32).

Then, converter control unit 520 compares highest temperature Tb1max among battery temperatures Tb11-Tb1$n$ with highest temperature Tb2max among battery temperatures Tb21-Tb2$n$, and sets the higher one as highest battery temperature Tbmax (step S33). Also, converter control unit 520 compares lowest temperature Tb1min among battery temperatures Tb11-Tb1$n$ with lowest temperature Tb2min among battery temperatures Tb21-Tb2$n$, and sets the lower one as lowest battery temperature Tbmin (step S34). Converter control unit 520 determines whether highest and lowest battery temperatures Tbmax and Tbmin thus set fall within a predetermined temperature range of (Tb1≤Tb≤Tb2) or not.

Specifically, converter control unit 520 determines whether highest battery temperature Tbmax is higher than upper limit value Tb2 of the predetermined temperature range or not (step S35). When highest battery temperature Tbmax is higher than upper limit value Tb2 (YES in step S35), converter control unit 520 employs highest battery temperature Tbmax as a representative value of battery temperature Tb (step S37).

Conversely, when highest battery temperature Tbmax is equal to or lower than upper limit value Tb2 (NO in step S35), converter control unit 520 further determines whether lowest battery temperature Tbmin is lower than lower limit value Tb1 of the predetermined temperature range or not (step S36). When lowest battery temperature Tbmin is lower than lower limit value Tb1 (YES in step S36), converter control unit 520 employs lowest battery temperature Tbmin as the representative value of battery temperature Tb (step S38).

Conversely, when lowest battery temperature Tbmin is equal to or higher than lower limit value Tb1 (NO in step S36), converter control unit 520 employs an average value (=(Tbmax+Tbmin)/2) of highest and lowest battery temperatures Tbmax and Tbmin as the representative value of battery temperature Tb (step S39).

Then, converter control unit 520 determines whether the SOC of power storage unit 10 or 20 is reset based on the reset request issued by request issuing unit 522 or not (step S40). When the SOC of power storage unit 10 or 20 is reset (YES in step S40), converter control unit 520 extracts the SOC corresponding to battery temperature Tb from the reset operation target SOC setting map (FIG. 6), and sets it as target SOC* (step S41).

Conversely, when neither of the SOCs of power storage units 10 and 20 has been reset (NO in step S40), converter control unit 520 extracts the SOC corresponding to battery temperature Tb from the ordinary operation target SOC setting map (FIG. 5), and sets it as target SOC* (step S42).

Further, converter control unit 520 extracts the voltage value corresponding to battery temperature Tb from the battery voltage upper-limit value setting map (FIG. 8), and sets it as battery voltage upper-limit value Vb_up (step S43).

Then, converter control unit 520 obtains SOC1 and SOC2 of first and second power storage units 10 and 20 from SOC1 and SOC2 arithmetic units 502 and 512, respectively. Converter control unit 520 obtains charge-allowed powers Win1 and Win2 of first and second power storage units 10 and 20 from Win1 and Win2 arithmetic units 504 and 514, respectively.

Converter control unit 520 determines, based on the target values thus set and the battery state thus obtained, whether power storage units 10 and 20 have satisfied the charge end condition in each of the management items (1)-(6) already described.

Specifically, converter control unit 520 first determines whether one of SOC1 and SOC2 of first and second power storage units 10 and 20 has reached target SOC* or not (step S46). When one of SOC1 and SOC1 has reached target SOC* (YES in step S46), converter control unit 520 determines that power storage units 10 and 20 have satisfied the first charge end conditions, and controls first and second converters 14 and 24 as well as charger 40 to end the external charging of power storage units 10 and 20 (step S52).

Conversely, when neither of SOC1 and SOC2 has reached target SOC* (NO in step S46), converter control unit 520 then determines whether charge time tch measured with timer 524 (FIG. 2) has reached estimated full-charge time tch* in each of power storage units 10 and 20, or not (step S47). When charge time tch has reached estimated full-charge time tch* in one of first and second power storage units 10 and 20 (YES in step S47), converter control unit 520 determines that power storage units 10 and 20 have satisfied the second charge end condition, and ends the external charging of power storage units 10 and 20 (step S52).

Conversely, when charge time tch has not reached estimated full-charge time tch* in first and second power storage units 10 and 20 (NO in step S47), converter control unit 520 further determines whether battery temperature Tb is equal to or higher than predetermined allowed temperature Tb_lim or not (step S48). When battery temperature Tb is equal to or higher than allowed temperature Tb_lim (YES in step S48), converter control unit 520 determines that power storage units 10 and 20 have satisfied the third charge end conditions, and ends the external charging of power storage units 10 and 20 (step S52).

Conversely, when battery temperature Tb is lower than allowed temperature Tb_lim (NO in step S48), converter control unit 520 determines whether rise temperature ΔTb of battery temperature Tb is equal to or higher than predetermined reference rise temperature ΔTb_std or not (step S49), When rise temperature ΔTb of battery temperature Tb is equal to or higher than reference rise temperature ΔTb_std (YES in step S49), converter control unit 520 determines that power storage units 10 and 20 have satisfied the charge end conditions, and ends the external charging of power storage units 10 and 20 (step S52).

Conversely, when rise temperature ΔTb of battery temperature Tb is lower than reference rise temperature ΔTb_std (NO in step S49), converter control unit 520 further determines whether battery voltages Vbat1 and Vbat2 of first and second power storage units 10 and 20 have reached battery voltage upper-limit value Vb_up or not (step S50). When one of battery voltages Vbat1 and Vbat2 has reached battery voltage upper-limit value Vb_up (YES in step S50), converter control unit 520 determines that power storage units 10 and 20 have satisfied the fifth charge end conditions, and ends the external charging of power storage units 10 and 20 (step S52).

Conversely, when neither of battery voltages Vbat1 and Vbat2 has reached battery voltage upper-limit value $Vb_{13}$ up (NO in step S50), converter control unit 520 determines whether the charge-allowed power total value (=Win1+Win2) of power storage units 10 and 20 is equal to or smaller than actual supply power value PAC supplied from external power supply 62 or not (step S51). When the charge-allowed power total value is equal to or smaller than the actual supply power value (YES in step S51), converter control unit 520 determines that power storage units 10 and 20 have satisfied the sixth charge end conditions, and ends the external charging (step S52).

Conversely, when the charge-allowed power total value is larger than the actual supply power value (NO in step S51), converter control unit 520 determines that power storage units 10 and 20 have not satisfied the first to sixth charge end conditions, and controls first and second converters 14 and 24 as well as charger 40 to continue the external charging of power storage units 10 and 20 (step S53). Then, converter control unit 520 returns to the initial processing.

As described above, the power supply system according to the embodiment of the invention performs the external charging of the plurality of power storage units as follows. When there is a possibility that the battery block in one of the power storage units is overcharged due to variations in characteristics between the battery blocks of the battery assembly forming the power storage unit, the system immediately ends the external charging operation without waiting for the fully charged state of the power storage unit. Consequently, the overcharging of each power storage unit can be reliably suppressed without performing the independent control of the external charging of each power storage unit.

Further, in each power storage unit, it is not required to perform the independent and thus complicated charge/discharge management for each battery block, and the overcharging of each battery block can be reliably suppressed by collectively performing the charge/discharge management for the whole power storage unit. Thereby, the deterioration of the battery characteristics of the battery blocks can be avoided.

Although the present invention has been described and illustrated in detail, it is clearly understood that the same is by way of illustration and example only and is not to be taken by way of limitation, the scope of the present invention being interpreted by the terms of the appended claims.

Industrial Applicability

The invention can be used in the power supply system equipped with the plurality of power storage mechanisms as well as the vehicle equipped with the same.

The invention claimed is:

1. A power supply system comprising:
a plurality of power storage mechanisms allowing charging and discharging;
a charger for receiving a power from an external power supply and externally charging said plurality of power storage mechanisms;
a state-estimating unit for estimating a remaining capacity of each of said plurality of power storage mechanisms;
a power storage mechanism temperature obtaining unit for obtaining a temperature of each of said plurality of power storage mechanisms, and obtaining a rise temperature of each of said plurality of power storage mechanisms based on the temperature of the corresponding one of said plurality of power storage mechanisms;
a power storage mechanism voltage value obtaining unit for obtaining the voltage value of each of said plurality of power storage mechanisms; and
a control unit for controlling the charging of said plurality of power storage mechanisms, said control unit including:
a charging unit for charging said plurality of power storage mechanisms with a charge current supplied from said charger when said plurality of power storage mechanisms attain a state allowing the charging by the external power supply,
a charge-allowed power deriving unit for deriving a charge-allowed power of each of said plurality of power storage mechanisms based on the estimated remaining capacity while said plurality of power storage mechanisms are being externally charged,
a first determining unit for determining a relationship in magnitude between a charge-allowed power total value being a total value of the derived charge-allowed powers of the respective power storage mechanisms and a predetermined preset value,
a charge ending unit for ending the external charging of said plurality of power storage mechanisms when said first determining unit determines that said charge-allowed power total value is equal to or smaller than said predetermined value,
a second determining unit for setting the remaining capacity target value of said plurality of power storage mechanisms based on the obtained temperature of each of said plurality of power storage mechanisms, and determining whether the estimated remaining capacity of each of said plurality of power storage mechanisms has reached said remaining capacity target value or not,
a third determining unit for determining whether the obtained temperature of each of said plurality of power storage mechanisms has reached a predetermined allowed upper-limit temperature or not,
a fourth determining unit for determining whether the obtained rise temperature of each of said plurality of power storage mechanisms is equal to or larger than a predetermined reference value or not,
a fifth determining unit for determining whether the obtained voltage value of each of said plurality of power storage mechanisms has reached a predetermined upper-limit voltage value or not, and
a sixth determining unit for calculating an estimated full-charge time required for completing the external charging of said plurality of power storage mechanisms, based on a difference between the estimated remaining capacity of each of said plurality of power storage mechanisms and the fully charged state, and determining whether an execution time of the external charging has reached said estimated full-charge time or not,
wherein:
said plurality of power storage mechanisms are connected in parallel to said charger, and
said charge ending unit ends the external charging of said plurality of power storage mechanisms, in response to satisfaction of one of such conditions that said first determining unit determines that said total value of the charge-allowed powers is equal to or smaller than said predetermined value, that said second determining unit determines that the remaining capacity of one of said plurality of power storage mechanisms has reached said remaining capacity target value, that said third determining unit determines that the temperature of one of said plurality of power storage mechanisms has reached said predetermined allowed upper-limit temperature, that said fourth determining unit determines that the rise temperature of one of said plurality of power storage mechanisms is equal to or larger than said predetermined reference value, that said fifth determining unit determines that the voltage value of one of said plurality of power storage mechanisms has reached said predetermined upper-limit voltage value, and that said sixth determining unit determines that the execution time of the external charging of one of said plurality of power storage mechanisms has reached said estimated full-charge time.

2. A power supply system comprising:
a plurality of power storage mechanisms allowing charging and discharging;
a charger for receiving a power from an external power supply and externally charging said plurality of power storage mechanisms;
a state-estimating unit for estimating a remaining capacity of each of said plurality of power storage mechanisms;

a power storage mechanism temperature obtaining unit for obtaining a temperature of each of said plurality of power storage mechanisms, and obtaining a rise temperature of each of said plurality of power storage mechanisms based on the temperature of the corresponding one of said plurality of power storage mechanisms;

a power storage mechanism voltage value obtaining unit for obtaining the voltage value of each of said plurality of power storage mechanisms; and a control unit for controlling the charging of said plurality of power storage mechanisms, said control unit including:

a charging unit for charging said plurality of power storage mechanisms with a charge current supplied from said charger when said plurality of power storage mechanisms attain a state allowing the charging by the external power supply, a charge-allowed power deriving unit for deriving a charge-allowed power of each of said plurality of power storage mechanisms based on the estimated remaining capacity while said plurality of power storage mechanisms are being externally charged, and a charge ending unit for ending the external charging of said plurality of power storage mechanisms, wherein said charge ending unit ends the external charging of said plurality of power storage mechanisms in response to satisfaction of one of such conditions that a charge-allowed power total value being a total value of the derived charge-allowed powers of the respective power storage mechanisms is equal to or smaller than a predetermined value, that the remaining capacity of one of said plurality of power storage mechanisms has reached the remaining capacity target value of said plurality of power storage mechanisms, that the temperature of one of said plurality of power storage mechanisms has reached a predetermined allowed upper-limit temperature, that the rise temperature of one of said plurality of power storage mechanisms is equal to or larger than a predetermined reference value, that the voltage value of one of said plurality of power storage mechanisms has reached a predetermined upper-limit voltage value, and that the execution time of the external charging of one of said plurality of power storage mechanisms has reached an estimated full-charge time required for completing the external charging of said plurality of power storage mechanisms.

3. The power supply system according to claim 2, wherein each of said plurality of power storage mechanisms is formed of a plurality of chargeable and dischargeable power storage units connected in series, said state-estimating unit estimates the remaining capacity of each of said plurality of power storage units, and said charge-allowed power deriving unit derives the charge-allowed power of the corresponding power storage mechanism based on the remaining capacity of the power storage unit exhibiting the maximum estimated remaining capacity.

4. The power supply system according to claim 2, wherein said state-estimating unit resets the remaining capacity of each of said plurality of power storage mechanisms to a reference value based on the voltage value of the corresponding power storage mechanism when said plurality of power storage mechanisms attain the state allowing the charging by the external power supply.

5. The power supply system according to claim 4, wherein said state estimating unit resets the remaining capacity of each of said plurality of power storage mechanisms based on the voltage value of corresponding one of said plurality of power storage mechanisms when said plurality of power storage mechanisms attain the state allowing the charging by the external power supply, and said control unit estimates said estimated full-charge time based on a difference between the estimated remaining capacitance of each of said plurality of power storage mechanisms and the full-charge state, after said state estimating unit resets the remaining capacitance of each of said plurality of power storage mechanisms to said reference value.

6. The power supply system according to claim 2, wherein each of said plurality of power storage mechanisms is formed of a plurality of chargeable and dischargeable power storage units connected in series, and when said power storage mechanism temperature obtaining unit obtains the temperature of each of the power storage units in each of said plurality of power storage mechanisms, said power storage mechanism temperature obtaining unit outputs the temperature of the power storage unit deviating from a predetermined temperature range to the largest extent as a representative value of the temperature of the corresponding power storage mechanism.

7. The power supply system according to claim 2, further comprising:

a plurality of voltage converting units corresponding to said plurality of power storage mechanisms, respectively; and a power line pair connected to said plurality of voltage converting units arranged in parallel with each other, wherein when said plurality of power storage mechanisms attain the state allowing the charging by the external power supply, said charging unit controls the corresponding voltage converting unit to charge said plurality of power storage mechanisms with the charge current supplied from said charger.

8. A vehicle comprising:

a power supply system according to claim 2; and a drive power generating unit receiving an electric power from said power supply system and generating a drive power.

9. A control method of a power supply system, the power supply system including: a plurality of power storage mechanisms allowing charging and discharging, a charger for receiving a power from an external power supply and externally charging said plurality of power storage mechanisms, a state-estimating unit for estimating a remaining capacity of each of said plurality of power storage mechanisms, a power storage mechanism temperature obtaining unit for obtaining a temperature of each of said plurality of power storage mechanisms, and obtaining a rise temperature of each of said plurality of power storage mechanisms based on the temperature of the corresponding one of said plurality of power storage mechanisms, and a power storage mechanism voltage value obtaining unit for obtaining the voltage value of each of said plurality of power storage mechanisms, said control method comprising steps of:

charging said plurality of power storage mechanisms with a charge current supplied from said charger when said plurality of power storage mechanisms attain a state allowing the charging by the external power supply;

deriving a charge-allowed power of each of said plurality of power storage mechanisms based on the estimated remaining capacity while said plurality of power storage mechanisms are being externally charged; and ending the external charging of said plurality of power storage mechanisms in response to satisfaction of one of such conditions that a charge-allowed power total value being a total value of the derived charge-allowed powers of the respective power storage mechanisms is equal to or smaller than a predetermined value, that the remaining capacity of one of said plurality of power storage mechanisms has reached the remaining capacity target value of said plurality of power storage mechanisms, that the temperature of one of said plurality of power storage mechanisms has reached a predetermined allowed upper-limit temperature, that the rise temperature of one of said plurality of power storage mechanisms is equal to or larger than a predetermined reference value, that the voltage value of one of said plurality of power storage mechanisms has reached a predetermined upper-limit voltage value, and that the execution time of the external charging of one of said plurality of power storage mechanisms has reached an estimated full-charge time required for completing the external charging of said plurality of power storage mechanisms.

10. The control method of the power supply system according to claim 9, wherein
said preset value is set to an actual value of the power supplied from the external power supply.

11. The control method of the power supply system according to claim 9, wherein
each of said plurality of power storage mechanisms is formed of a plurality of chargeable and dischargeable power storage units connected in series,
said state-estimating unit estimates the remaining capacity of each of said plurality of power storage units, and
said step of deriving said charge-allowed power derives the charge-allowed power of the corresponding power storage mechanism based on the remaining capacity of the power storage unit exhibiting the maximum estimated remaining capacity.

12. The control method of the power supply system according to claim 9, wherein
said state-estimating unit resets the remaining capacity of each of said plurality of power storage mechanisms to a reference value based on the voltage value of the corresponding power storage mechanism when said plurality of power storage mechanisms attain the state allowing the charging by the external power supply.

13. The control method of the power supply system according to claim 9, wherein
said state estimating unit resets the remaining capacity of each of said plurality of power storage mechanisms based on the voltage value of corresponding one of said plurality of power storage mechanisms when said plurality of power storage mechanisms attain the state allowing the charging by the external power supply, and
said step of ending the external charging of said plurality of power storage mechanisms estimates said estimated full-charge time based on a difference between the estimated remaining capacitance of each of said plurality of power storage mechanisms and the full-charge state, after said state estimating unit resets the remaining capacitance of each of said plurality of power storage mechanisms to said reference value.

14. The control method of the power supply system according to claim 9, wherein
each of said plurality of power storage mechanisms is formed of a plurality of chargeable and dischargeable power storage units connected in series, and
when said power storage mechanism temperature obtaining unit obtains the temperature of each of the power storage units in each of said plurality of power storage mechanisms, said power storage mechanism temperature obtaining unit outputs the temperature of the power storage unit deviating from a predetermined temperature range to the largest extent as a representative value of the temperature of the corresponding power storage mechanism.

15. The control method of the power supply system according to claim 9, wherein
said power supply system further includes:
a plurality of voltage converting units corresponding to said plurality of power storage mechanisms, respectively; and
a power line pair connected to said plurality of voltage converting units arranged in parallel with each other, wherein
when said plurality of power storage mechanisms attain the state allowing the charging by the external power supply, said step of charging controls the corresponding voltage converting unit to charge said plurality of power storage mechanisms with the charge current supplied from said charger.

16. The power supply system according to claim 2, wherein
said control unit sets said preset value to an actual value of the power supplied from the external power supply.

* * * * *